US011314807B2

(12) United States Patent
Hershowitz et al.

(10) Patent No.: US 11,314,807 B2
(45) Date of Patent: Apr. 26, 2022

(54) METHODS AND SYSTEMS FOR COMPARISON OF STRUCTURED DOCUMENTS

(71) Applicant: Xcential Corporation, Encinitas, CA (US)

(72) Inventors: Ari Hershowitz, Palo Alto, CA (US); Ian Christopher Davey, Charlottesville, VA (US)

(73) Assignee: Xcential Corporation, Encinitas, CA (US)

( * ) Notice: Subject to any disclaimer, the term of this patent is extended or adjusted under 35 U.S.C. 154(b) by 187 days.

(21) Appl. No.: 15/983,377

(22) Filed: May 18, 2018

(65) Prior Publication Data
US 2019/0354636 A1    Nov. 21, 2019

(51) Int. Cl.
*G06F 17/00*       (2019.01)
*G06F 16/838*      (2019.01)
(Continued)

(52) U.S. Cl.
CPC ........ *G06F 16/838* (2019.01); *G06F 16/1794* (2019.01); *G06F 16/81* (2019.01); *G06N 20/00* (2019.01)

(58) Field of Classification Search
CPC .. G06F 17/218; G06F 17/272; G06F 17/2211; G06F 17/22477; G06F 16/80;
(Continued)

(56) References Cited

U.S. PATENT DOCUMENTS 4,625,295 A    11/1986   Skinner et al.
5,956,726 A     9/1999   Aoyama et al.
(Continued)

FOREIGN PATENT DOCUMENTS

EP    0380294 A1    1/1990
WO    2016145480 A1    9/2016

OTHER PUBLICATIONS

Al-Kalifa et al., Querying Structured Text in an XML Database, SIGMOD, 2003, pp. 4-15 (Year: 2003).*
(Continued)

*Primary Examiner* — Andrew T McIntosh
(74) *Attorney, Agent, or Firm* — Asif Ghias

(57) ABSTRACT

Systems and methods of comparing structured documents are disclosed. From/to source documents are first represented by their respective from/to XML forms based on a predetermined schema. One or more from nodes are selected from the from XML document to compare to one or more to nodes from the to XML document. The comparison employs a set of matching functions that may be selected based on the domain of the source documents. The matching functions may compare just the tags of XML elements, and/or their text contents and/or any of their relevant attributes. The matching may be exact or approximate. Each matching function computes a score which may be weighted. For each pair of from/to nodes, an overall match-score is computed based on the scores of the individual matching functions. If the match-score reaches a matching-threshold, the pair is determined to be a match and further matching is stopped. The techniques are extended for comparing multiple from documents to a to document.

23 Claims, 15 Drawing Sheets

(51) Int. Cl.
*G06N 20/00* (2019.01)
*G06F 16/81* (2019.01)
*G06F 16/178* (2019.01)

(58) Field of Classification Search
CPC ........ G06F 16/81; G06F 16/84; G06F 16/285; G06F 16/313; G06F 16/838; G06F 16/1794; G06N 5/022; G06N 20/00
See application file for complete search history.

(56) References Cited

U.S. PATENT DOCUMENTS

| | | | |
|---|---|---|---|
| 6,502,112 B1 | 12/2002 | Baisley | |
| 6,772,165 B2 | 8/2004 | O'Carroll | |
| 6,848,078 B1 | 1/2005 | Birsan et al. | |
| 6,996,575 B2 | 2/2006 | Cox et al. | |
| 7,165,216 B2 | 1/2007 | Chidlovskii et al. | |
| 7,185,277 B1 | 2/2007 | Bernstein et al. | |
| 7,295,965 B2 | 11/2007 | Haigh et al. | |
| 7,296,223 B2 | 11/2007 | Chidlovskii | |
| 7,392,471 B1* | 6/2008 | Ford | G06F 17/2211 715/229 |
| 7,437,664 B2 | 10/2008 | Borson | |
| 7,440,967 B2 | 10/2008 | Chidlovskii | |
| 7,533,122 B2 | 5/2009 | Drumm et al. | |
| 7,558,792 B2 | 7/2009 | Bier | |
| 7,680,833 B1 | 3/2010 | Cole et al. | |
| 7,974,934 B2 | 7/2011 | Ravikumar et al. | |
| 8,447,755 B1 | 5/2013 | Melbourne et al. | |
| 8,495,002 B2 | 7/2013 | Nelken et al. | |
| 8,612,373 B2 | 12/2013 | Chidlovskii | |
| 8,726,144 B2 | 5/2014 | Chidlovskii et al. | |
| 8,805,861 B2 | 8/2014 | Boyan et al. | |
| 9,009,153 B2 | 4/2015 | Khan et al. | |
| 9,047,611 B2 | 6/2015 | Krishnamoorthy et al. | |
| 9,128,906 B2 | 9/2015 | Peters et al. | |
| 9,244,679 B1 | 1/2016 | Arellano et al. | |
| 9,678,949 B2 | 6/2017 | Monk et al. | |
| 9,830,381 B2 | 11/2017 | Fan et al. | |
| 9,842,161 B2 | 11/2017 | Byron et al. | |
| 10,430,423 B1* | 10/2019 | Poddar | G06F 16/24578 |
| 2003/0028566 A1 | 2/2003 | Nakano | |
| 2003/0069881 A1 | 4/2003 | Huttunen | |
| 2003/0149934 A1 | 8/2003 | Worden | |
| 2003/0237047 A1* | 12/2003 | Borson | G06F 17/2211 715/229 |
| 2004/0162827 A1 | 8/2004 | Nakano | |
| 2005/0060332 A1* | 3/2005 | Bernstein | G06F 16/86 |
| 2005/0198120 A1 | 9/2005 | Reshef | |
| 2005/0267885 A1 | 12/2005 | Klier | |
| 2006/0130047 A1 | 6/2006 | Burugapalli | |
| 2006/0218160 A1* | 9/2006 | Bhatia | G06F 17/2211 |
| 2006/0288275 A1 | 12/2006 | Chidlovskii et al. | |
| 2007/0050705 A1 | 3/2007 | Liu et al. | |
| 2007/0240035 A1 | 10/2007 | Sthanikam et al. | |
| 2009/0018990 A1 | 1/2009 | Moraleda | |
| 2009/0249291 A1* | 10/2009 | Bak | G06F 8/71 717/110 |
| 2010/0088676 A1 | 4/2010 | Yuan et al. | |
| 2010/0146382 A1 | 6/2010 | Abe et al. | |
| 2011/0066626 A1 | 3/2011 | Dharmalingam | |
| 2011/0093462 A1 | 4/2011 | Meyer et al. | |
| 2012/0078942 A1 | 3/2012 | Cai et al. | |
| 2012/0109905 A1 | 5/2012 | Tingstrom et al. | |
| 2013/0198605 A1* | 8/2013 | Nicola | G06F 40/14 715/234 |
| 2013/0304769 A1 | 11/2013 | Nicola et al. | |
| 2013/0325848 A1 | 12/2013 | Daud et al. | |
| 2014/0006922 A1 | 1/2014 | Smith et al. | |
| 2014/0013205 A1* | 1/2014 | Mikhaiel | G06F 17/2247 715/234 |
| 2014/0032513 A1 | 1/2014 | Gaither | |
| 2015/0154164 A1 | 6/2015 | Goldstein et al. | |
| 2016/0055196 A1 | 2/2016 | Collins et al. | |
| 2017/0053025 A1 | 2/2017 | DeSousaWebber et al. | |
| 2017/0103441 A1 | 4/2017 | Kolb et al. | |
| 2017/0161390 A1 | 6/2017 | Kavas | |
| 2017/0300565 A1 | 10/2017 | Calapodescu et al. | |
| 2017/0351750 A1 | 12/2017 | Rokhlenko et al. | |
| 2019/0146784 A1* | 5/2019 | Krauss | G06F 8/71 717/122 |

OTHER PUBLICATIONS

Al-Wasil et al., Establishing an XML Metadata Knowledge Base to Assist Integration of Structured and Semi-structured Databases, ADC 2006, pp. 1-10 (Year: 2006).*

Achananuparp, Palakorn, "The Evaluation of Sentence Similarity Measures", College of Information Science and Technology, Drexel University, Sep. 2-5, 2008, pp. 305-316 Philadelphia, PA, USA.

Agreste, Santa, "XML Matchers: approaches and challenges", Knowledge Based Systems, Jul. 10, 2014, pp. 190-209, Messina, Italy.

Akhtar, Shazia, "Automating XML Markup using Machine Learning Techniques", Systemics, Cybernetics And Informatics, 2004, pp. 203-208, vol. 2, No. 5, Dublin, Ireland.

Antila, Christopher, "A Hierarchical Diff Algorithm For Collaborative Music Document Editing", 3rd International Conference on Technologies for Music Notation and Representation (TENOR), May 24, 2017, pp. 1-4, Artabria, Spain.

Bar, Daniel, "UKP: Computing Semantic Textual Similarity by Combining Multiple Content Similarity Measures", First Joint Conference on Lexical and Computational Semantics (*SEM), , Jun. 7, 2012, pp. 435-440, Montreal, Canada.

Charbel, Nathalie, "Resolving XML Semantic Ambiguity", 18th International Conference on Extending Database Technology (EDBT), Mar. 23, 2015, pp. 277-288, Brussels, Belgium.

Chawathe, Sudarshan S., "Change Detection in Hierarchically Structured Information", Stanford University, Jun. 1, 1996, pp. 1-31, Palo Alto, CA, USA.

Chien, Shu-Yao, "Efficient Structural Joins on Indexed XML Documents", 28th VLDB Conference, Jan. 1, 2002, pp. 263-274, Hong Kong, China.

Ciancarini, Paolo, "Bridging the gap between tracking and detecting changes in XML", Software: Practice and Experience, Wiley Online Library, Dec. 8, 2014, pp. 227-250, vol. 46, No. 2, New Jersey, USA.

Cobena, Gregory, "Detecting Changes in XML Documents", 18th International Conference on IEEE, Feb. 26, pp. 11-52, 2002, USA.

Cohen, Edith, "Labeling Dynamic XML Trees", Society for Industrial and Applied Mathematics, Feb. 24, 2010, vol. 39, No. 5, pp. 2048-2074, Philadelphia, PA, USA.

Denoyer, Ludovic, "Bayesian network model for semi-structured document classification", Information processing & management, Sep. 1, 2004, vol. 40, No. 5, pp. 807-827, Paris, France.

Doan, Anhai, "Learning to Match the Schemas of Data Sources: A Multistrategy Approach", Machine Learning, 2003, vol. 50, pp. 279-301, The Netherlands.

Doan, Anhai, "Reconciling Schemas of Disparate Data Sources: A Machine-Learning Approach", ACM SIGMOD, May 21, 2001, pp. 509-520, Santa Barbara, California, USA.

Dommitt, "Online Diff and Merge Utility for XML.", http://xml.coverpages.org/ni2001-05-08-b.html, May 8, 2001, pp. 1-1, MA, USA.

Flesca, Sergio, "Fast Detection of XML Structural Similarity", IEEE Transactions On Knowledge and Data Engineering, Jan. 10, 2005, pp. 160-175, vol. 17, No. 2, USA.

Gnu, "Diff", FreeBSD, 1997, pp. 1-3, USA.

Gomaa, Wael H, "A Survey of Text Similarity Approaches", International Journal of Computer Applications, Apr. 13, 2013, pp. 13-18, vol. 68—No. 13, USA.

Guzman, Renato, "Structural and semantic similarity for XML comparison", Proceedings of the Fifth International Conference on Management of Emergent Digital EcoSystems. ACM, Oct. 28, 2013, p. 177-181, Luxembourg.

Habib, Naomi, "A Novel Bayesian DNA Motif Comparison Method for Clustering and Retrieval", PLoS Computational Biology, Feb. 29, 2008, pp. 1-16, vol. 4, No. 2, MA, USA.

(56) References Cited

OTHER PUBLICATIONS

Hatzivassiloglou, Vasileios, "Detecting Text Similarity over Short Passages: Exploring Linguistic Feature Combinations via Machine Learning", Joint SIGDAT conference on empirical methods in natural language processing and very large corpora, 1999, pp. 203-212, USA.
Hottinger, Daniel, "XML-Diff_Algorithmen", Thesis, Department of Computer Science, Swiss Federal Institute, Jul. 13, 2005, pp. 1-49, Switzerland.
Jeong, Buhwan, "A novel method for measuring semantic similarity for XML schema matching", Apr. 1, 2008, Expert Systems with Applications, pp. 1651-1658, South Korea.
Jeong, Buhwan, "Machine-Learning based Semantic Similarity Measures to Assist Discovery and Reuse of Data Exchange XML Schema", Dissertation, Department of Industrial and Management Engineering Pohang University of Science & Technology, Oct. 2005, pp. 1-77, South Korea.
JNDIFF, "JNDiff project page", http://jndiff.sourceforge.net/, Jul. 27, 2018, pp. 1-1.
Kurgan, Lukasz, "Semantic Mapping of XML Tags using Inductive Machine Learning", Dept of Computer Science, UC Denver, 2002, pp. 1-11, CO, USA.
Li, Shuangyin, "Self-paced Compensatory Deep Boltzmann Machine for Semi-Structured Document Embedding", Twenty-Sixth International Joint Conference on Artificial Intelligence, Aug. 19, 2017, pp. 2187-2193, Melbourne, Australia.
Liu, S., "An automatic mark-up approach for structured document retrieval in engineering design", International Journal of Advanced Manufacturing Technologies, Aug. 1, 2008, pp. 418-425, Bath, UK.
Magdaleno, Damny, "Clustering XML Documents Using Structure and Content based on a New Similarity Function OverallSimSUX", Computación y Sistemas, Mar. 19, 2015 Mar, vol. 19 No 1, pp. 151-161, Villa Clara, Cuba.
Marian, Amelie, "Change-Centric Management of Version in an XML Warehouse", 27th VLDB Conference, Sep. 11, 2001, pp. 581-590, Rome, Italy.
Mihalcea, Rada, "Corpus-based and Knowledge-based Measures of Text Semantic Similarity", American Association for Artificial Intelligence, 2006, pp. 775-780, USA.
Morishima, Atsuyuki, "A Machine Learning Approach to Rapid Development of XML Mapping Queries", 20th International Conference on Data Engineering, Apr. 2, 2004, pp. 276-287, Boston, MA, USA.
Myers, Eugene W., "An O(ND) Difference Algorithm and Its Variations", Algorithmica, 1986 pp. 251-266, New York, USA.
Nierman, Andrew, "Evaluating Structural Similarity in XML Documents", Webdb, 2002, vol. 2 pp. 61-66, MI, USA.
Piwowarski, Benjamin, "A Machine Learning Model for Information Retrieval with Structured Documents", International Conference on Machine Learning and Data Mining, Jul. 2003, pp. 425-438, Berlin, Germany.
Ponzetto, Simone Paolo, "Knowledge Derived From Wikipedia For Computing Semantic Relatedness", Journal of Artificial Intelligence Research 30, Oct. 2007, pp. 181-212, CA, USA.
Qi, Zhao-Hui, "Novel DNA Sequence Comparison Method Based on Markov Chain and Information Entropy", Mini Reviews In Organic Chemistry, pp. 524-533, vol. 6, No. 6, Bentham Science, Rende, Italy.
Rahman, Muhammad Mahbubur, "Understanding the Logical and Semantic Structure of Large Documents", Sep. 3, 2017, pp. 1-10, MD, USA.
Rendon, Gloria, "Sequence Similarity Methods", SC 11 Education, NCSA, Jun. 2011, pp. 1-78, USA.
Rodriquez, Ivan Sanchez, "Text similarity by using GloVe word vector representations", Master's thesis, Department of Computer Systems and Computation, Polytechnic University of Valencia, 2016-2017, pp. 1-59, Valencia, Spain.
Sahami, Mehran, "A Web-based Kernel Function for Measuring the Similarity of Short Text Snippets", International World Wide Web Conference Committee (IW3C2), May 23, 2006, pp. 377-386, Edinburgh, Scotland.
Tekli, Joe, "A Novel XML Document Structure Comparison Framework based-on Sub-tree Commonalities and Label Semantics", Web Semantics: Science, Services and Agents on the World Wide Web, Mar. 1, 2012, vol. 11, pp. 14-40, Sao Paulo, Brazil.
Tekli, Joe, "Semantic and Structure Based XML Similarity: The XS3 Prototype", International Conference on Management of Data COMAD, Dec. 14, 2006, pp. 218-221, Delhi, India.
Tekli, Joe, "XML Document Comparison: Appendix", LE2I Laboratory UMR-CNRS, University of Bourgogne, May 2010, pp. 1-9, Dijon, France.
Tekli, Joe, "XML Document-Grammar Comparison: Related Problems and Applications", Computer Science and Statistics Department, University of Sao Paulo, 2011, pp. 117-136, SP, Brazil.
Tran Tien, "Combining Structure and Content Similarities for XML Document Clustering", Australian Computer Society, Inc., Seventh Australasian Data Mining Conference (AusDM), 2008, pp. 1-8, Gleneg, Australia.
Vanderbeck, Scott, "A Machine Learning Approach to Identifying Sections in Legal Briefs", Dept of Electrical Engineering & Computer Science, University of Wisconsin, Apr. 2011, pp. 16-22 , WI, USA.
Wang, Jiaxing, "FB-Diff: A Feature Based Difference Detection Algorithm for Process Models", Web Services (ICWS), Jun. 25, 2017, pp. 604-611, IEEE 24th International Conference on Web Services, Honolulu, HI, USA.
Wang, Yuan, "X-Diff: An Effective Change Detection Algorithm for XML Documents", IEEE, Mar. 5, 2003, Madison, pp. 519-530, WI, USA.
Wisniewski, Guillaume, "Probabilistic Model for Structured Document Mapping Application to Automatic HTML to XML Conversion", International Workshop on Machine Learning and Data Mining in Pattern Recognition, Jul. 18, 2007, pp. 854-867, Berlin, Germany.
Yang, Jianwu, "XML Document Classification using Extended VSM", Institute of Computer Science & Technology, 2007, pp. 200-210, Peking University, Beijing, China.
Zhang, Kaizhong, "Simple Fast Algorithms For The Editing Distance Between Trees and Related Problems", Society for Industrial and Applied Mathematics, Dec. 1989, vol. 18, No. 6, pp. 1245-1262, New York, USA.
Zhang, Zhongping, "Similarity Metric for XML Documents", Fudan University, 2003, pp. 1-7, Shanghai, China.
Zhang, Li Jun, "Structure and Content Similarity for Clustering XML Documents", International Conference on Web-Age Information Management, Jul. 15, 2010, pp. 116-124, Springer, Berlin Heidelberg, Germany.

\* cited by examiner

A. ~~Definitions.—~~

~~"Citizen" means an individual who has all of the rights of citizenship.~~

~~"Resident" is a person who lives in this country for more than six months of the year.~~

B. Purpose.—
The purpose of this law is to define the eligibility criteria for becoming a citizen.

B. Definitions.—

"Citizen" is a person who meets the requirements of section XXX of the Constitution.

"Resident" is a person who lives in this country for more than six months of the year.
C. Becoming a Citizen.—

After two years of continuous residence, a resident may apply for citizenship.

D. Effectivity.—

These provisions will become effective on the first day of the year two-thousand twenty.

~~C. Application for Citizenship.—~~

~~A resident may apply to become a citizen after two years of continuous residence.~~

SECTION 1. SHORT TITLE. This Act may be cited as the "Protecting American Talent and Entrepreneurship Act of 2015" or the "PATENT Act".

SEC. 2. ~~EFFECTIVE DATE~~SEVERABILITY.

~~Except as otherwise provided in~~If any provision of this Act, or amendment made by this Act, or the applicability of such provisions ~~of this Act shall take effect~~ amendment to any person or circumstance, is held to be invalid, the remainder of ~~the date of enactment of this Act, and shall apply to any patent issued, or any action filed~~is Act, or an amendment made by this Act, or the application of such provision to other person or ~~after that date~~circumstances shall not be affected.

SEC. 3. ~~SEVERABILITY~~DEFINITIONS.

(1) ~~If ANY PROVISION OF THIS ACT~~DIRECTOR.— The term "DIRECTOR" means the ~~is to be invalid, the remainder of this Act, or an amendment made by this Act, or the application of such provision to other persons or circumstances, shall not be affected~~Under Secretary of Commerce for Intellectual Property and Director of the United States Patent and Trademark Office.

(2) OFFICE.— The term "OFFICE" means the United States Patent and Trademark Office.

SEC. 4. PLEADING REQUIREMENTS FOR PATENT INFRINGEMENT ACTIONS.

(a) ELIMINATION OF FORM 18.— Not later than 1 month...

SEC. 5.

~~DEFINITIONS~~

(1) DIRECTOR.— The term "DIRECTOR" ~~mean~~Effective date

Except as o~~the Under Secretary of Commerce for Intellectual Property and~~therwise provided in this Act, the provisions of this Act shall take effect or~~n the United States Patent and Trademark Office~~.

(2) OFFICE.— The term "OFFICE" means the United States Patent and Trademark Office.

date of enactment of this Act, and shall apply to any patent issued, or any action filed, on or after that date.

Section 1. Short title summary

This Act may be cited as the Reducing Regulatory Burdens Act of 2018. concerns Zika Vector Control. It may be related to other Acts dealing with infectious disease.

Section 1A. Unrelated section that is deleted entirely

The section is unrelated to the rest of the sections in the Act. This section is completely consistent with an unrelated Short title
This Act may be cited as the "Zika Vector Control Act.".

Section 1B. Moving sections.

This demonstrates tracking of a moved section.

Sec. 2. Use of authorized pesticides

Section 3(f) of the Federal Insecticide, Fungicide, and Rodenticide Act (7 U.S.C. 136a(f)) is amended by adding at the end the following:

"(5) Use of authorized pesticides.—

"(A) In general.— Except as provided in section 402(s) of the Federal Water Pollution Control Act, the Administrator or a State may not require a permit under such Act for a discharge from a point source into navigable waters of a pesticide authorized for sale, distribution, or use under this Act, or the residue of such a pesticide, resulting from the application of such pesticide.

"(B) Sunset.— This paragraph shall cease to be effective on September 30, 2018.".

Section 2AB. Moving insertion of sections

This demonstrates tracking of a section that the subsection contains content that was not in the from document Sec. 3. Discharges of pesticides Section 402 of the Federal Water Pollution Control Act (33 U.S.C. 1342) is amended by adding at the end the following:

"(s) Discharges of pesticides.—

"(1) No permit required.— A permit shall not be required by the Administrator or a State under this Act for a discharge from a point source into navigable waters of a pesticide authorized for sale, distribution, or use under the Federal Insecticide, Fungicide, and Rodenticide Act, or the residue of such a pesticide, resulting from the application of such pesticide.

"(2) Sunset.— This subsection shall cease to be effective on September 30, 2018.".

A. Purpose. The purpose of this law is to define the eligibility criteria for becoming a citizen.

A.B. Definitions. "Citizen" means _____ a person who meets the requirements of section XXX of the Constitution.

"Resident" is a person who lives in this country for more than six months of the year.

C. Applicable for Citizenship. _____ Becoming a Citizen. After two years of continued residence, a resident may apply for citizenship.

B.D. Effectivity. These provisions will become effective on the first day of the year two-thousand twenty.

116

116

Section 1. Short title.—
This Act may be cited as the "Protecting American Talent and Entrepreneurship Act of 2015" or the "PATENT Act".

Sec. §2. Severability
If any provision of this Act, or an amendment made by this Act, or the application of such provision to any person or circumstance, is held to be invalid, the remainder of this Act, or an amendment made by this Act, or the application of such provision to other persons or circumstances, shall not be affected.

Sec. §3. Definitions
(1) Director.— The term "Director" means the Under Secretary of Commerce for Intellectual Property and Director of the United States Patent and Trademark Office.
(2) Office.— The term "Office" means the United States Patent and Trademark Office.

Sec. 4. Pleading requirements for patent infringement actions
(a) Elements of Form 18.— Not later than 1 month after the date of enactment of this Act, the Supreme Court, using existing resources, shall eliminate Form 18 in the Appendix to the Federal Rules of Civil Procedure (Complaint for Patent Infringement).
(b) Pleading requirements.—
  (1) Amendment.— Chapter 29 of title 35, United States Code, is amended by inserting after section 281 the following:

"§281A. Pleading requirements for patent infringement actions
  "(a) Pleading Requirements.— In a civil action in which a party asserts a claim for relief arising under any Act of Congress relating to patents, a party alleging infringement shall include in a complaint, counterclaim, or cross-claim for patent infringement, except as provided in subsection (c), the following:
  "(1) An identification of each patent allegedly infringed.
  "(2) An identification of each claim of each patent identified under paragraph (1) that is allegedly infringed.
  "(3) For each claim identified under paragraph (2), an identification of each accused process, machine, manufacture, or composition of matter (referred to in this section as an 'accused instrumentality') alleged to infringe the claim.
  "(4) For each accused instrumentality identified under paragraph (3), an identification with particularity, if known, of—
    "(A) the name or model number (or a representative model number) of each accused instrumentality; or
    "(B) if there is no name or model number, a description of each accused instrumentality.
  "(5) For each claim identified under paragraph (2), a description of the elements thereof that are alleged to be infringed by the accused instrumentality and how the accused instrumentality is alleged to infringe those elements.
  "(6) For each claim of indirect infringement, a description of the acts of the alleged infringer that are alleged to contribute to or induce the direct infringement.
  "(b) Dismissal for Failure To Meet Pleading Requirements.— The court shall, on the motion of any party, dismiss any count or counts of the complaint, counterclaim, or cross-claim for patent infringement if the requirements of paragraphs (1) through (6) of subsection (a) are not met with respect to such count or counts. The fact that a party pleads in accordance with subsection (c) shall not be a basis for dismissal if the party nonetheless states a plausible claim for relief sufficient under the Federal Rules of Civil Procedure.

Sec. §5. Effective date
Except as otherwise provided in this Act, the provisions of this Act shall take effect on the date of enactment of this Act, and shall apply to any patent issued, or any action filed, on or after that date.

Section 1. Short title
This Act may be cited as the "Reducing Regulatory Burdens Act of 2015".

Section 1B. Unrelated section
This section is unrelated to any section in the output. In the Prior Art, this section is incorrectly compared with an unrelated section.

Sec. 2. Use of authorized pesticides
Section 3(f) of the Federal Insecticide, Fungicide, and Rodenticide Act (7 U.S.C. 136a(f)) is amended by adding at the end the following:

"(5) Use of authorized pesticides.—

Except as provided in section 402(s) of the Federal Water Pollution Control Act, the Administrator or a State may not require a permit under such Act for a discharge from a point source into navigable waters of a pesticide authorized for sale, distribution, or use under this Act, or the residue of such a pesticide, resulting from the application of such pesticide.

Section 2A. Moving sections.
This demonstrates tracking of a section that is moved.

Sec. 3. Discharges of pesticides
Section 402 of the Federal Water Pollution Control Act (33 U.S.C. 1342) is amended by adding at the end the following:

"(s) Discharges of pesticides.—

"(1) No permit requirement.— A permit shall not be required by the Administrator or a State under this Act for a discharge from a point source into navigable waters of a pesticide authorized for sale, distribution, or use under the Federal Insecticide, Fungicide, and Rodenticide Act, or the residue of such a pesticide, resulting from the application of such pesticide.

*Fig. 7A*

```xml
<main >
  <section id="H2CF" id2="/s1">
    <num value="1">Section 1.</num><h>Short title</h>
    <p>This Act may be cited as the "Reducing Regulatory Burdens Act of 2015"</p>
  </section>
  <section id="H2CB" id2="/s1b">
    <num value="1">Section 1B.</num><h>Unrelated section</h>
    <p>This section is unrelated...</p>
  </section>
  <section id="HA76" id2="/s2">
    <num value="2">Sec. 2.</num><h>Use of authorized pesticides</h>
    <p>Section 3(f) ... is amended by adding at the end the following:</p>
    <quote id="H4E2" id2="/s2/qB"><par id="H6E5" id2="/s2/qB/5">
      <num value="5">^(5)</num><h>Use of authorized pesticides.—</h>
      <subpar id="H049" id2="/s2/qB/5/A">
        <p>Except as provided in section 402(s)...</p>
      </subpar></par></quote>
  </section>
  <section id="H2CF" id2="/s2a">
    <num value="1">Section 2A.</num><h>Moving sections.</h>
    <p>This demonstrates tracking of a section that is moved.</p>
  </section>
  <section id="HF7F" id2="/s3">
    <num value="3">Sec. 3.</num><h>Discharges of pesticides</h>
    <p>Section 402 ... is amended by adding at the end the following:</p>
    <quote id="H925" id2="/s3/qB"><subsection id="HB52" id2="/s3/qB/s">
      <num value="s">^(s)</num><h>Discharges of pesticides.—</h>
      <par id="HB0E" id2="/s3/qB/s/1"><num value="1">^(1)</num><h>No permit requirement.—</h><p>A permit shall not be required...</p></par>
    </subsection></quote>
  </section>
</main>
```

Section 1. Summary
This Act concerns Zika Vector Control. It may be related to other Acts dealing with infectious disease.

Section 1A. Short title
This Act may be cited as the "Zika Vector Control Act".

Section 1B. Moving sections.
This demonstrates tracking of a moved section.

Sec. 2. Use of authorized pesticides
Section 3(f) of the Federal Insecticide, Fungicide, and Rodenticide Act (7 U.S.C. 136a(f)) is amended by adding at the end the following:

"(5) USE OF AUTHORIZED PESTICIDES.—

"(A) IN GENERAL.— Except as provided in section 402(s) of the Federal Water Pollution Control Act, the Administrator or a State may not require a permit under such Act for a discharge from a point source into navigable waters of a pesticide authorized for sale, distribution, or use under this Act, or the residue of such a pesticide, resulting from the application of such pesticide.

"(B) Sunset.— This paragraph shall cease to be effective on September 30, 2018."

Section 2B. Insertion of section
This section contains content that was not in the from document.

Sec. 3. Discharges of pesticides
Section 402 of the Federal Water Pollution Control Act (33 U.S.C. 1342) is amended by adding at the end the following:

"(s) DISCHARGES OF PESTICIDES.—

"(1) NO PERMIT REQUIREMENT.— A permit shall not be required by the Administrator or a State under this Act for a discharge from a point source into navigable waters of a pesticide authorized for sale, distribution, or use under the Federal Insecticide, Fungicide, and Rodenticide Act, or the residue of such a pesticide, resulting from the application of such pesticide.

"(3) Sunset.— This subsection shall cease to be effective on September 30, 2018."

*Fig. 8A*

```
<main >
<section id="H2CF" id2="/s1">
<num value="1">Section 1.</num><h>Summary</h>
<p>This Act concerns Zika Vector Control. It may be related to other Acts dealing with infectious disease.</p>
</section>
<section id="H2FB" id2="/s1a">
<num value="1">Section 1A.</num><h>Short title</h>
<p>This Act may be cited as the "Zika Vector Control Act".</p>
</section>
<section id="H2CR" id2="/s1b">
<num value="1">Section 1B.</num><h>Moving sections.</h>
<p>This demonstrates tracking of a moved section.</p>
</section>
<section id="HA76" id2="/s2">
<num value="2">Sec. 2.</num><h>Use of authorized pesticides</h>
<p>Section 3(f) ... is amended by adding at the end the following:</p>
<quote id="H4E2" id2="/s2/qB"><par id="H6E5" id2="/s2/qB/5">
<num value="5">(5)</num> id2="/s2/qB/5"><h>Use of authorized pesticides.—</h>
<subpar id="H049" id2="/s2/qB/5/A">
<num value="A">(A)</num>
<h>In general.—</h>
<p>Except as provided in section 402(s)....</p>
</subpar>
<subpar id="HF92" id2="/s2/qB/5/B">
<num value="B">(B)</num><h>Sunset.—</h>
<p>This paragraph shall cease to be effective on September 30, 2018.".</p>
</subpar>
</par></quote>
</section>
<section id="H2CN" id2="/s2b">
<num value="2B">Section 2B.</num><h>Insertion of section</h>
```

```
<p>This section contains content that was not in the from document.</p>
</section>
<section id="HF76" id2="/s3">
<num value="3">Sec. 3.</num><h>Discharges of pesticides</h>
<p>Section 402 ... is amended by adding at the end the following:</p>
<quote id="H925" id2="/s3/q8"><subsection id="HB52" id2="/s3/q8/s">
<num value="s">"(s)</num><h>Discharges of pesticides.—</h>
<par id="HB0E" id2="/s3/q8/s/1">
<num value="1">"(1)</num><h>No permit requirement.—</h>
<p>A permit shall not be required...</p>
</par>
<par id="H7B8" id2="/s3/q8/s/3">
<num value="3">"(3)</num><h>Sunset.—</h>
<p>This subsection shall cease to be effective on September 30, 2018.".</p>
</par>
</subsection></quote>
</section>
</main>
```

Inserted Sections

| Section |
|---|
| Section 1. Summary |
| Section 2B. Insertion of section |

Deleted Sections
Section 1A. Unrelated section that is deleted entirely

Text Changes

| Section |
|---|
| Section 1A. Short title |
| Section 1B. Moving sections. |
| Sec. 2. Use of authorized pesticides |
| Sec. 3. Discharges of pesticides |

*Fig. 9A*

*Section 1. Summary*
*This Act concerns Zika Vector Control. It may be related to other Acts dealing with infectious disease.*

Section 1.1. Short title
This Act may be cited as the "~~Reducing Regulatory Burdens Act of 2015~~ *Zika Vector Control Act*".
(NOTE-- DELETED /s1a: ~~Section 1A. Unrelated section that is deleted entirely~~)

Section 2A/B. Moving sections.
This demonstrates tracking of a *moved section ~~that is moved~~*.

Sec. 2. Use of authorized pesticides

Section 3(f) of the Federal Insecticide, Fungicide, and Rodenticide Act (7 U.S.C. 136a(f)) is amended by adding at the end the following:

"(5) USE OF AUTHORIZED PESTICIDES.—

"*(A)* *(A) IN GENERAL*.— Except as provided in section 402(s) of the Federal Water Pollution Control Act, the Administrator or a State may not require a permit under such Act for a discharge from a point source into navigable waters of a pesticide authorized for sale, distribution, or use under this Act, or the residue of such a pesticide, resulting from the application of such pesticide.

"*(B) SUNSET.—This paragraph shall cease to be effective on September 30, 2018.*".

*Section 2B. Insertion of section*
*This section contains content that was not in the /from document.*

Sec. 3. Discharges of pesticides

Section 402 of the Federal Water Pollution Control Act (33 U.S.C. 1342) is amended by adding at the end the following:

"(s) DISCHARGES OF PESTICIDES.—

"(1) NO PERMIT REQUIREMENT.— A permit shall not be required by the Administrator or a State under this Act for a discharge from a point source into navigable waters of a pesticide authorized for sale, distribution, or use under the Federal Insecticide, Fungicide, and Rodenticide Act, or the residue of such a pesticide, resulting from the application of such pesticide.

"*(3) SUNSET.—This subsection shall cease to be effective on September 30, 2018.*".

METHODS AND SYSTEMS FOR COMPARISON OF STRUCTURED DOCUMENTS

FIELD OF THE INVENTION

The present invention relates to apparatus and methods for comparing structured documents in a semantically meaningful way.

BACKGROUND OF THE INVENTION

There is an ever increasing need to improve our ability to manage information stored in electronic documents. While documents are created, edited and stored, many "living" documents are subsequently revised/re-edited many times throughout their useful life by many different authors, and for the benefit of a variety of audiences. Though there is a rich history of art for managing documents and to track changes in them, present techniques to-date rely on some form of textual and/or structural differencing between different versions of the same document. The prior art results using such techniques demonstrate a high degree of inefficiency and information loss for the user looking to accurately grasp exactly what changed in the document, and potentially the motivations behind the change.

Let us take a look at a prior art example to make this clear. Consider the two exemplary documents presented below, which may be the two revised versions of the same document or equivalently two separate documents altogether that are needed to be compared.

TABLE 1

| From document | To document |
| --- | --- |
| A. Definitions.-- "Citizen" means an individual who has all of the rights of citizenship. "Resident" is a person who lives in this country for more than six months of the year. B. Effectivity.-- These provisions will become effective on the first day of the year two-thousand twenty. C. Application for Citizenship.-- A resident may apply to become a citizen after two years of continuous residence. | A. Purpose.-- The purpose of this law is to define the eligibility criteria for becoming a citizen. B. Definitions.-- "Citizen" is a person who meets the requirements of section XXX of the Constitution. "Resident" is a person who lives in this country for more than six months of the year. C. Becoming a Citizen.-- After two years of continuous residence, a resident may apply for citizenship. D. Effectivity.-- These provisions will become effective on the first day of the year two-thousand twenty. |

Using the techniques of the prior art, a comparison between above from document and to document produces results 10 as shown FIG. 1A. As can be seen in the prior art of FIG. 1A, the comparison, though technically valid, fails to consider the semantic meaning of the various sections and contents of the document pertinent to the domain that the documents belong to. Notice the unnecessary deletion and insertion of the "Definitions" section, for instance. FIG. 1B and FIG. 1C provide further exemplary results 12 and 14 respectively of poor incorporation of semantic relevance and document structure during document comparison in the prior art. As will be explained in this disclosure, the present invention utilizes the semantic information of the contents of the document and its relevance to the domain of the documents and performs a much more meaningful comparison of the from/to documents.

In general, prior art consists of three main types of teachings:
1. Classification and clustering of structured documents, and in particular XML (extensible mark-up language) documents.
2. Text similarity and differencing algorithms, based on calculating string distances (e.g. edit distance).
3. Machine learning algorithms for text classification and categorization.

In the case of structured documents, XML has been widely deployed as a standard for representing a document as structured data. In an XML document, various nodes of the document are enclosed in labels (represented by angle braces or tags such as <name>Elena</name>). These "elements" may enclose other underlying or successive elements representing nodes in the document model or have no underlying elements representing leaf nodes in the document model. In either case, they may also contain inline text between the tags as well as attributes associated with the tags. XML documents may be described by a schema which provides the list of labels and rules for applying the labels to a document.

Many methods are available for automation, or semi-automation, of the process of labeling plain text into nodes of an XML document. These methods involve identifying common patterns and may be aided by machine learning methods employing Bayesian analysis, classification, etc. There are also techniques based on heuristics that classify or cluster XML documents based on a variety of structural features, e.g. by tracing edges of a hierarchy or by comparing the labels assigned to structural levels. Clustering, or classification algorithms are used to mine large data stores of XML documents to find documents that may be relevant to a particular search or query.

Other methods have been developed to map the particular labels chosen to represent different items in a document, for example, for mapping a label <name> in one document, to an equivalent label <firstname> in another document. Often, the mapping is carried out to compare the same document marked up using two different ways into XML. These methods do not consider the textual content inside the nodes and how that content contributes to similarity of nodes.

In the area of text differencing, there are algorithms that compute the distance between strings and calculate a difference between the strings. Many algorithms provide a distance or similarity measure to compare two strings. An important measure, for example, is the "edit distance", which is the minimum number of changes that are required to convert one string into another. Text differencing algorithms may also look ahead in the document for matching strings of text and attempt to align those strings in order to improve the textual comparison.

String matching algorithms are limited in their ability to recognize the structure or semantic value of a document to carry out comparison functions. For example, in a new version of a document, the text of the "Background" section may be significantly changed, yet a human reader would consider the two sections to be similar. This is true, even if the section is moved to another location in the document. String comparison algorithms are particularly poor at recognizing structural units that have been moved and altered. Finally, machine learning based techniques include methods that take an existing algorithm and allow it to be iteratively improved with the input of training in a supervised fashion.

There is also plenty of patent literature teaching such document comparison techniques in general and in various domains. U.S. Pat. No. 7,296,223 B2 to Chidlovskii et al. teaches a method for creating a structured document, where the structured document comprises a plurality of content elements wrapped in pairs of tags. It teaches parsing a document of a particular type containing content into a plurality of content elements and for each content element, suggesting an optimal tag according to a tag suggestion procedure. The tag suggestion procedure includes providing sample data which has been converted into a structured sample document, deriving a set of tags from the structured sample document and evaluating the set of tags according to tag suggestion criteria. The objective is to determine an optimal tag for the content element. The optimal tag may be a single tag or a pattern of tags which maximizes a similarity function with patterns found in the sample data.

U.S. Patent Publication No. 2017/0300565 A1 to Calapodescu et al. discloses a method for extracting entities from a text document. The method provides for a first set of entities extracted from a section of the document and clustering a subset of the extracted entities in the first set into clusters. The clustering is done based on locations of the entities in the document. Complete clusters of entities are identified and patterns for extracting new entities are learned based on the complete clusters. New entities are also extracted from incomplete clusters based on the learned patterns.

U.S. Patent Publication No. 2017/0103441 A1 to Kolb et al. discloses a computer method and system to match buyer requirements to evidence documents of vendors. The system comprises a database of evidence documents and organizations. A user may enter their requirements using natural language, which the system analyzes to determine which evidence documents are most relevant.

There are also many teachings in Non-Patent Literature (NPL) in this field. In the article entitled "Structural and semantic similarity for XML comparison" by Guzman et al. of San Pablo Catholic University of Peru and appearing in ACM publication of 2013, the authors present a new method for comparing XML documents based on a Level-Edge that combines tag structure and semantic similarities.

Tran et al. of Queensland University of Technology, Australia in their paper entitled "Combining Structure and Content Similarities for XML Document Clustering" and appearing in Australian Data Mining Conference (AusDM) 2008, propose a clustering approach that explores both the content and the structure of XML documents for determining similarity among them. Assuming that the content and the structure of XML documents play different roles and importance depending on the use and purpose of a dataset, the content and structure information of the documents are handled using two different similarity measuring methods. The similarity values produced from these two methods are then combined with weightings to measure the overall document similarity.

The effect of structure similarity and content similarity on the clustering solution is thoroughly analyzed. Their experiments purportedly report that clustering of the text-centric XML documents based on the content-only information produces a better solution in a homogeneous environment with documents derived from one structural definition. However, in a heterogeneous environment where documents are derived from two or more structural definitions, clustering of the text-centric XML documents produces a better result when the structure and the content similarities of the documents are combined with different strengths.

In the reference entitled "Probabilistic Model for Structured Document Mapping" of University of Paris, France, 2007, Wisniewski et al. address the problem of learning to automatically map heterogeneous semi-structured documents onto a mediated target XML schema. They adopt a machine learning approach where the mapping between input and target documents is learned from a training corpus of documents. They first introduce a general stochastic model of semi-structured document generation and transformation. The model relies on the concept of a meta-document which is a latent variable providing a link between input and target documents. It allows them to learn the correspondences when the input documents are expressed in a large variety of schemas. They then detail an instance of the general model for the particular task of HTML to XML conversion. They test the solution on three different corpora using two different inference methods: a dynamic programming method and an approximate Learning as Search Optimization (LaSO) method.

Tekli et al. in their article entitled "XML Document-Grammar Comparison: Related Problems and Applications" appearing in Central European Journal of Computer Science 1 (2011), present an overview on existing research related to XML document/grammar comparison. They present the background of the field and discuss the various techniques related to the problem. They also discuss some prominent application domains consisting of document classification and clustering, document transformation, grammar evolution, selective dissemination of XML information, XML querying, alert filtering in intrusion detection systems, and Web Services matching and communications.

NPL reference entitled "A Machine Learning Approach to Identifying Sections in Legal Briefs" by Vanderbeck et al. of University of Wisconsin, Milwaukee, Wis. dated 2011, discloses a two-stage supervised learning approach for automatically identifying section boundaries and types in appellee briefs. Their approach uses learned classifiers in a two-stage process to categorize white-space separated blocks of text. First, they use a binary classifier to predict whether or not a text block is a section header. Next, they classify those blocks predicted to be section headers in the first stage into one of 19 section types. A cross-validation experiment purportedly shows that their approach has over 90% accuracy on both tasks and is significantly more accurate than baseline methods.

In their paper entitled "Semantic Mapping of XML Tags using Inductive Machine Learning", dated 2002, Kurgan et al. of Department of Computer Science and Engineering, University of Colorado describe a system called XMapper. The system is used to generate semantic mapping between two XML sources that describe instances from the same domain. The described system uses only standalone XML documents (without DTD or XML schema documents) to generate the mappings. It also utilizes machine learning to improve accuracy of such mappings for difficult domains. Several experiments that use artificial and real-life domains described by XML documents are used to test their proposed system. The results purportedly show that mappings generated by the XMapper are highly accurate for both types of XML sources. The generated mappings can be used by a data integration system to automatically merge content of XML data sources to provide unified information for a data processing application.

Even with the abundance of prior art teachings in the field, none of the above techniques are still able to present truly semantically meaningful comparative results to the user. What is needed is a comparison system and methods that use the structure, contents and domain-specific semantics of an input or from document while comparing it to another version of the same document or a different output document. The results produced from such a comparison will bring about tremendous efficiencies and productivity gains in related domains to drafters, editors and managers of the documents. Such techniques absent from the prior art are addressed by the present invention as will be discussed in detail in this disclosure.

OBJECTS AND ADVANTAGES

In view of the shortcomings of the prior art, it is an object of the invention to provide techniques for comparing an input or from document to an output or to document in a semantically relevant manner. Such comparison will be specific to the domain of the document and will include both the structural and content differences between the documents.

It is also an object of the invention to allow for a human curator to provide weights and thresholds of similarities required in the above comparison that are relevant to the domain of the documents.

It is also an object of the invention to provide various matching functions that may be selected for comparing the documents and/or their nodes based on the domain of the documents.

It is further an object of the invention to use the techniques of supervised machine learning to improve the quality of comparison over time.

These and other objects and advantages of the invention will become apparent upon reading the detailed specification and reviewing the accompanying drawing figures.

SUMMARY OF THE INVENTION

The present invention relates to methods and systems for comparing an input or from document to an output, target or to document. First, both the from document and the to document are converted into their respective XML representations. A number of techniques, manual and/or automatic, and standards known in the art and as available may be employed for this purpose. For example, United States Legislative Markup™ (USLM) standard for the legislative domain, electronic business XML (ebXML™) set of standards for business, MusicXML™ for music, etc. may be used.

Next, an XPath™ or an alternative structured XML query is used to select one or more from nodes from the from and one or more to nodes from the to documents respectively. One or more of from nodes thus selected are then compared to the one or more to nodes thus selected from the to document. The above comparison based on the instant techniques is performed by using various matching sub-functions that may be specific to the domain of the from and to documents being compared.

Each sub-function or simply function computes a score from its comparison. The scores from the individual sub-functions are then combined to produce an overall match-score for the comparison of a specific from node and a specific to node. The match-score is determined as a function of the individual scores computed by the sub-functions. In the preferred embodiment, the score computed by each sub-function is weighted based on the sub-function and then the overall match-score is computed as a weighted-average of the individually weighted scores. The specific from and to nodes thus compared are considered to belong to a pair and the match-score is assigned to the pair.

If the match-score of a pair is equal to or above a specified matching-threshold then the corresponding from and to nodes in the pair are considered or determined to be a match. The results of the comparison of the from and to documents are presented in a comparison report. The comparison report identifies the matched nodes, moved nodes, inserted nodes and deleted nodes between the from and to documents. The comparison report may further identify potential matches between the from and to nodes in a ranked order based on their match-scores. The comparison report may also provide information derived from the sub-functions to specify what changes have been made, for example, change in section title only, or change in the "Definitions" section, etc. The results thus presented in the comparison report are much more meaningful and relevant to the user than any text comparison techniques known in the prior art.

Each from node and each to node comprises at least one XML element and any text contents between the XML tags of the element. While comparing the from/to nodes, the sub-functions may just compare the tag names of the elements or nodes passed onto them as arguments and/or the text contents between the XML tags. The sub-functions may further compare any relevant attributes associated with the respective XML elements.

In a similar manner and depending on the requirements of a given domain-specific implementation, the sub-functions may further compare the tag names, text contents and any relevant attributes of one or more underlying or successive XML elements. The choice and functionality of the sub-functions can be flexibly made based on the requirements of the domain that the from and to documents belong to. Before comparing the text contents of the from and to nodes by the matching sub-functions, any surrounding XML tags around the texts are first removed, then the texts are compared, and the surrounding XML tags are replaced to preserve the hierarchy of the documents.

The text comparison may be an exact comparison or a "significant enough" comparison or yet a keyword-based comparison. In a highly preferred embodiment, a human curator first determines the most relevant level at which the from and to nodes in the from and to XML representations should be compared. For example, in the legislative domain, the most relevant level may be the section of the original document that may be represented by the <section> elements of the XML. In the case of court opinions, the most relevant level may be the paragraph that may be represented by the <para> or <paragraph> elements of the XML.

The human curator is preferably an expert of the domain. The curator may also determine the specific sub-functions to be utilized for the comparison of the from and to nodes. The curator can further assign weights to the sub-functions and determine the best way to combine the individual scores of the sub-functions to produce the overall match-score. Such a combination may be a straight addition or some other more complicated combination of the individual sub-function scores. Based on the knowledge of the domain, the human curator is also able to judge the correct value of the matching-threshold for the match-score above which the from and to nodes of the corresponding pair are determined to be a match.

Various domains to which the from and to documents belong that may benefit from the present techniques include but are not limited to the overall legal domain including the legislative domain, intellectual property, medical, technical, scientific, business, real-estate, literary, music, philosophical and religious domains.

In another preferred embodiment, the matching sub-functions may include a sine function or a step function that computes its score with a value between 0 and 1. If the match-score of a pair is above the curator established matching-threshold and further if the position/location of the from node in the from document is the same as that of the to location of the to node in the to document, then this indicates that the from and to nodes are an identical or prefect match. However, the definition of an identical match may vary based on the domain of the from and to documents. Alternatively, if the locations of the from and to nodes of a matched pair are different in their respective source documents, then this indicates that the from node has moved from its from location in the from document as a to node at the to location in the to document.

According to the present design, if a from node has no matching to node in any of the pairs, then this indicates that the from node has been deleted in the to document. Similarly, if a to node has no matching from node in any of the pairs, then this indicates that the to node has been inserted in the to document.

In a highly preferred embodiment, a human curator or user is able to override the results presented in the comparison report and manually indicate if a from node actually matches a to node or not. Preferably, such an overriding-input and/or the configuration of the above discussed matching-threshold and/or weights can be provided by one or more users/curators using an appropriate graphical user interface (GUI) by employing techniques known in the art.

Preferably, the user is also able to add annotations in the comparison report to explain the rationale behind the overriding-inputs provided or to further make the report more useful. In another highly preferred embodiment, any overriding-inputs are also provided to one or more supervised machine learning algorithms that can automatically adjust the match-scores of the pairs in the future based on the inputs provided by the user. The machine learning algorithms are preferably hosted on a server. The human curator(s)/user(s) then provide their overriding-inputs from client(s) communicating with the server.

The present techniques are also extended to embodiments that may compare more than one from documents to a to document. Such an application is useful when a number of different versions of the same document are being compared to a final version, or alternatively for clustering of documents. The only difference from the prior embodiments is that the from nodes from the plurality of from XML representations of the respective from documents are first selected for comparison with the to nodes of the to document.

The present invention, including the preferred embodiment, will now be described in detail in the below detailed description with reference to the attached drawing figures.

BRIEF DESCRIPTION OF THE DRAWING FIGURES

FIG. 1A-C show results of comparison of various exemplary documents based on the techniques of the prior art.

FIG. 5 shows the much more useful and semantically relevant comparison report generated by the present techniques in contrast to the prior art result of FIG. 1A.

FIG. 6 shows the much more useful and semantically relevant comparison report generated by the present techniques in contrast to the prior art result of FIG. 1B.

Figure 2:
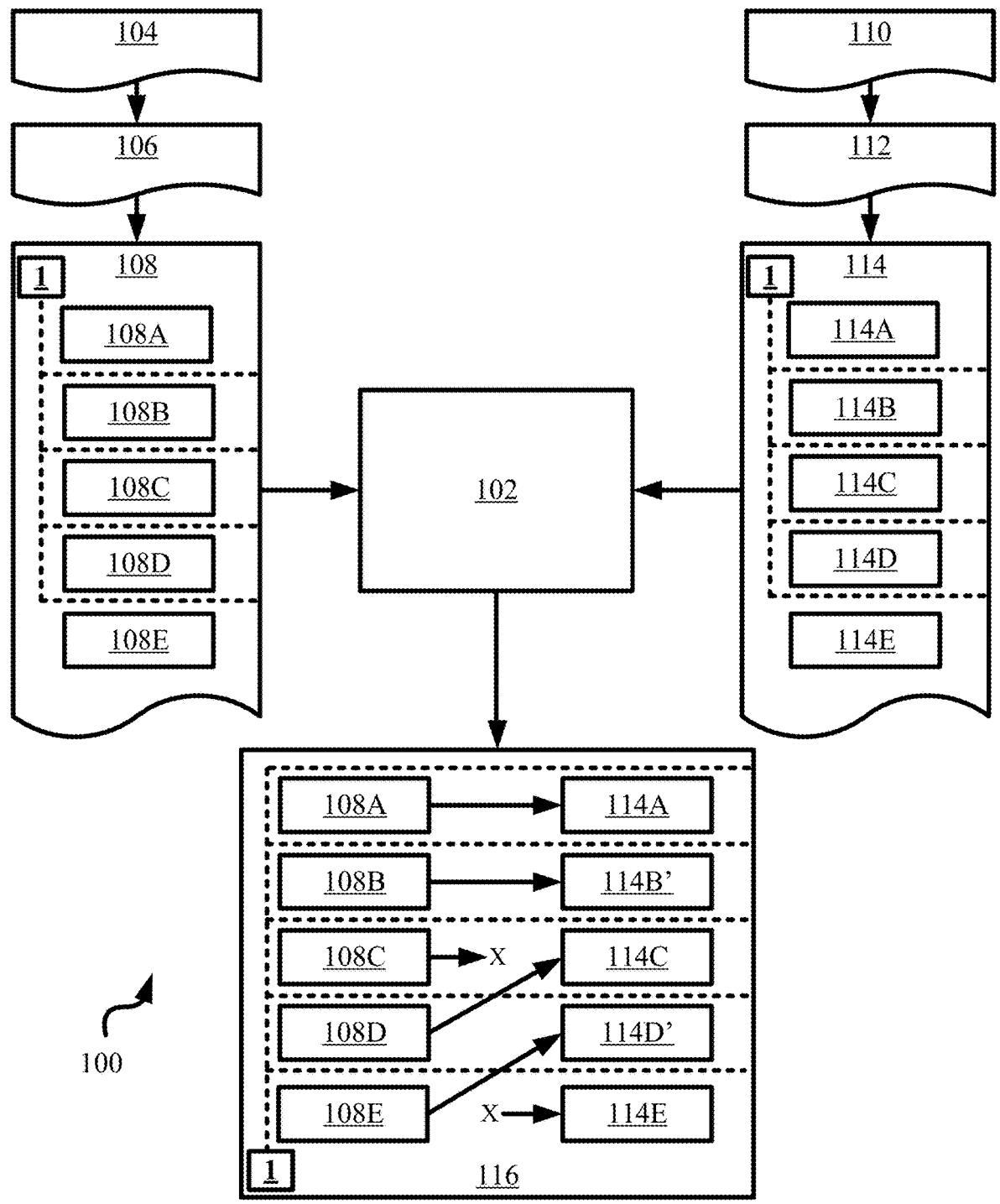
FIG. 2 illustrates an overall diagram explaining the various embodiments of the structured document comparison techniques of the present design.

FIG. 7A-B show yet another exemplary source from document and its from XML representation based on the present techniques.

FIG. 8A-C show an exemplary source to document and its to XML representation corresponding to the documents of FIG. 7A-B.

FIG. 9A-B show much more useful and semantically relevant comparison summary and detailed report generated by the present techniques corresponding to the from/to documents of FIGS. 7A-B and FIGS. 8A-C, and in contrast to the prior art comparison 14 of FIG. 1C.

DETAILED DESCRIPTION

The drawing figures and the following description relate to preferred embodiments of the present invention by way of illustration only. It should be noted that from the following discussion many alternative embodiments of the methods and systems disclosed herein will be readily recognized as viable options. These may be employed without straying from the principles of the claimed invention. Likewise, the figures depict embodiments of the present invention for purposes of illustration only.

Structured document comparison methods and systems described herein will be best appreciated by initially reviewing the document comparison system 100 as illustrated in FIG. 2. FIG. 2 illustrates the techniques of comparing a from document 104 and a to document 110 using a document comparison engine or module 102 of the present design. From and to documents 104 and 110 respectively may be any documents in any formats as conveniently required for a given implementation. Note that from document 104 and to document 110 may also be in different formats.

A non-exhaustive list of such popular documents/formats with any typical file extensions includes ASCII (American Standard Code for Information Interchange), UTF-8—plain text formats, AmigaGuide™, .doc for Microsoft™ Word—Structural binary format developed by Microsoft™ (specifications available since 2008 under the Open Specification Promise), DjVu™, DocBook™, HTML (.html, .htm), FictionBook (.fb2), Office Open XML (.docx), OpenDocument™ (.odt), OpenOffice.org OpenOffice™ (.sxw), Open XML Paper Specification or OpenXPS™ (OXPS), PalmDoc™, Plucker™, PDF™, PDF/X (PDF eXchange), PDF/A (PDF Archive), PDF/E (PDF Engineering), ISO 32000 (PDF), PDF/UA (PDF Accessibility), PDF/VT (PDF/Variable and transactional printing), PostScript™ (.ps), Rich Text Format™ (RTF), SYmbolic LinK™ (SYLK), Scalable Vector Graphics™ (SVG), TeX™, XML (Extensible Markup Language™) format for digital publication (TEI), Troff™, Uniform Office Format™ (UOF) and WordPerfect™ (.wpd, .wp, .wp7, .doc).

Original from or input and to or output documents 104 and 110 respectively are first converted into their respective hierarchical XML representations 106 and 112 using techniques known in the art. For example, Microsoft Word natively allows saving of an MS Word (.doc/docx) document into an XML document. Similarly, there are native facilities or external utilities available to convert most or all of today's document formats into their respective XML representations exemplarily shown as XML documents/representations 106 and 112 in FIG. 2.

The conversion techniques of original source documents 104 and 110 into respective hierarchical XML documents or representations 106 and 112 respectively may also employ manual means of creating the XML markup. Alternatively, they may employ building a parser that interprets the structure of source documents 104/110 as an XML in the desired schema, hierarchy or standard as available. For example, United States Legislative Markup™ (USLM) standard for the legislative domain, electronic business XML (ebXML™) set of standards for business, MusicXML™ for music, etc. may be used. Such conversion/parsing techniques for creating corresponding XML documents 106/112, whether employing manual and/or automatic means are appreciated in the art and will not be delved into further in this disclosure.

XML documents/representations 106/112 may or may not be compliant to the popular document object Model™ (DOM) structure. Note however, that it is important that from/to or input/output XML representations 106/112 follow the same structure or standard or hierarchy or schema or model in order to benefit from the comparison techniques discussed herein.

One or both of source from/to documents 104/110 respectively may also be in plaintext while corresponding XML documents 106/112 are prepared manually and/or automatically from the plaintext. In other words, the initial conversion from the plaintext source format of one or both of from/to documents to their XML forms may be a creation/preparation of the XML representation by a human user or via a software program. Still alternatively, one or both of the initial from/to source documents may already be in XML format and no initial conversion to the respective XML representation may be required. In any event, it is the from/to hierarchical XML representations 106/112 respectively that are used for comparison and as will be discussed in detail further below.

Of course, it is also possible that just one of from/to documents 104/110 exists in XML form, while the other document exists in a different source format which still needs to be converted to its corresponding XML representation. In any scenario, and as noted, it is the from and to XML representations in a standardized or predetermined structure/schema, such as documents 106 and 112 in FIG. 2, that are compared using the instant comparison techniques.

Let us now understand the working of document comparison system 100 of the preferred embodiment shown in FIG. 2 in detail. From XML representation or document 106 may contain any number of from nodes and to XML representation or document 112 may contain any number of to nodes. Each from/to node may be thought of as an XML representation of a section or a provision of the original source document. In other words, each from/to node may be thought of as a section or provision, as known in the normal vernacular, of the respective from/to source documents. Taking a specific example, a from node may be the XML representation of a section with the heading "Definitions" at the beginning of source document 104 and consequently XML document 106. A to node may be the XML representation of the next section with the heading "Effectivity" in to document 110 and consequently XML document 112.

It follows from above that from/to nodes of the from/to XML documents 106/112 represent nodes in a model representation or hierarchy or schema of the documents, for example, the document object model (DOM). However, adherence of from/to XML documents 106/112 to the specific DOM standard is not requirement of the present design. Each element of the XML documents may be considered as a node, with underlying elements as child nodes, until leaf nodes representing elements with no underlying elements of their own are reached. Therefore, we may use the term node to refer to an element of the XML document.

According to the present techniques, a selection of various from/to nodes or elements from respective from/to XML documents 106/112 is first made using an XPath™ query expression or selector. In alternative embodiments, instead of or in addition to XPath, another appropriate structured XML query expression, for example XQuery™, may be used. To avoid detraction, the below teachings may oftentimes refer to only XPath for the selection of nodes, with the implicit knowledge that an alternative structured query expression may be used within the scope of the present principles.

XML documents 106/112 can potentially be much larger documents or corpuses. The above process results in a from selection 108 of from nodes 108A, 108B, 108C, 108D and 108E and a to selection 114 of to nodes 114A, 114B, 114C, 114D, 114E. From nodes 108A-E exist at from level 1 in from XML document 106 as shown. Similarly, to nodes 114A-E also exist at to level 1 in to XML document 112 as shown. The dotted lines in from/to XML selections 108/114 of respective from/to nodes 108A-E/114A-E indicate the levels/depth of the corresponding nodes in respective XML documents 106/112 and consequently the levels of the corresponding sections/provisions in source documents 104/110 respectively.

Note that it is possible to not use an initial XPath selector at all or for the XPath selector to be an empty query for one or both of from/to XML documents, in which case the entirety of one or both of from/to XML documents will be retrieved and matched. Similarly, it is also possible to have more than one XPath selectors to be applied to retrieve from/to or input/output selections 108/114 of from/to XML nodes 108A-E/114A-E. Furthermore, the example of FIG. 2 shows equal number of from nodes 108A-E and 114A-E in respective from/to XML selections 108/114 for clarity of explanation. However, that is not a requirement and from and to XML selections may have different number of from and to XML nodes. Furthermore, to avoid unnecessary repetition, we may also at times refer to from/to XML selections 108/114 as simply from/to XML documents 108/114 with the knowledge that these selections are sourced from potentially larger from/to XML documents 106/112 respectively.

As will be explained, using the instant innovative techniques heretofore unknown, comparison engine 102 is able to precisely compare in a semantically meaningful manner selected from nodes 108A-E with selected to nodes 114A-E and produce a comparison report 116 shown in FIG. 2. Traditional text and document comparison techniques produce technically valid but significantly less useful results leading to inefficient use of resources. Such inefficiencies of the prior art addressed by the present design are manifest in environments where documents evolve under the supervision/editing of many different people.

For the following discussion, the reader is reminded that an XML element consists of or is enclosed in two matching XML tags. For example, an XML element <div> will consist of XML tags <div> and </div>. When the following discussion refers to comparing or matching elements of from and to XML documents, it means that the tag names of the corresponding elements and/or the text within the tags of the elements and/or any associated relevant attributes of the from and to elements are being compared.

For example, if a from element <section> of a from document is compared to a to element <section> of a to document, then that means that the tags <section></section> of the from element <section> are compared to tags <section></section> of the to element <section>. Depending on the embodiment and as will be explained, this may also mean that the text between the from <section> and </section> tags is being compared to the text between to <section> and </section> tags of the to document. For this text comparison, the respective surrounding <section></section> tags are first removed, then the text comparison is done and the surrounding <section></section> tags are replaced to preserve the hierarchy of the documents.

Furthermore, and again depending on the embodiment, matching of from/to elements or nodes may further mean that any relevant attributes specified, such as attr1, attr2 in from <section attr1=val1, attr2=val2, attr3=val3> are being compared to attr1, attr2 in to <section attr1=val1, attr2=val2, attr3=val3>. Depending on the requirements of a given embodiment, the above process may be repeated for any number of XML elements underlying the <section> elements of the from/to documents.

Moreover, a text match may refer to an exact match or an approximate or significant match depending on the domain-specific implementation or embodiment of the design. For some embodiments specific to the domains that the from/to documents belong to, an exact match of the text may be required for the respective elements to be considered a match. For this purpose, any of a number of text comparison algorithms available in the art may be used, such as diff-match-patch, or the like.

For other domain-specific implementations, an approximate match or a significant enough match may suffice. Such a determination of significant/approximate matching may be done using an appropriate approximate text matching algorithm, such as one using an edit distance or an N-Gram score known in the art. Still other domain-specific embodiments may require that a certain keyword or keywords must match, for example, "appropriation" or "rights" or "citizen", etc. for legislative documents and "symptoms" or "contraindications", etc. for medical documents. Alternatively, this determination may also be performed by one or more human users/experts and/or machine learning algorithms. As such, we may simply use the term "match" to refer to a match as applicable for a given embodiment.

In the preferred embodiment, for each to node, the nodes of the from document are compared and scored according to the combination of matching functions to determine the best match and, in some embodiments, a list of lesser matches, with a matching score associated with each. In many embodiments, the from nodes are tested for an identical match, which will, by definition be the best match. The value of testing for identical matches first is primarily one of efficiency: once an identical match is identified, other nodes do not need to be compared to determine the best match. Identical matches and related functionality will be discussed further below in this disclosure.

Referring back to FIG. 2, now the topmost XML element of from/to node 108A/114A is compared to the topmost XML element of the to/from node 114A/108A. Depending on the needs of the embodiment, and per above explanation, then any next underlying XML elements/nodes of the two from/to nodes are compared and then any next underlying elements/nodes and so on, until there are no more respective from/to elements to match. Of course, as noted above, before the comparisons the surrounding XML tags are removed, then the text comparison performed, and then the surrounding XML tags replaced. From here onwards, this aspect of the removal and replacement of surrounding XML tags, is presumed to exist and may be omitted from below explanation to avoid unnecessary repetition and to avoid detraction from the main principles being taught.

Continuing with the above example, if text contained within every respective elements of from/to nodes 108A/114A and all underlying nodes or elements match, then this is considered a perfect or an identical match of the two from/to nodes according to the present design. This further implies that from/to nodes have the same location or position in their respective XML documents 106/112. Again, depending on the domain that from/to documents 104/110 belong to, the definition of an identical match may vary.

For example, for certain domains it may just be required that respective elements <num> and underlying elements <heading> match, while for others it may be required that respective elements <num>, underlying elements <heading>, further underlying elements <paragraph> and further underlying elements <content> all match. For still other embodiments, the match above may just be an approximate or a "significant enough" match and still be treated as an identical match.

Report 116 explicitly shows that from node 108A of from XML document 106 is such an identical match of node 114A of to XML document 112. An identical match is shown with appropriate markings/markups in report 116 so that it is suitably readable and apparent to the user. In one embodiment, this is done by reproducing the text of the identical node and all underlying nodes. Strikethrough font and underlining may be used to display any modified text. Any additional highlighting and color may also be used as desired.

Report 116 further shows that one or more higher-level from elements of from node 108B match the respective one or more to elements of to node 114B while one or more respective elements underlying the higher-level elements of the two from/to nodes differ. In an exemplary scenario, this may be when <num> and <heading> elements of nodes 108B and 114B match, while underlying <content> elements do not. Such a modification is indicated by a prime "'" on reference numeral 114B' in FIG. 2. Again, when we say that the two <content> elements mismatch or do not match, we may mean that they are not an exact match or not a significant enough match based on the domain-specific implementation of the present teachings. A text mismatch or a modification may be shown in report 116 by strikethrough font and underling of the differing texts of the respective elements of from/to nodes 108B/114B' and using highlighting as desired.

Report 116 further explicitly shows that from node 108C has been deleted in to XML document 114 as shown by the "X" symbol and the arrow in FIG. 2. A deletion is observed when the comparison of one or more elements of from node 108C to the respective one or more elements of any of to nodes 114A-E reveals no match. The number of elements and which elements are required to match as well as how significant the match needs to be may depend on the specific domain of the from/to documents or the implementation of the teachings. In an exemplary domain which from/to source documents 104/110 respectively belong to, a deletion may be detected when <heading> element of from node 108C does not match with the <heading> element of any of to nodes 114A-E. A deletion may be shown in report 116 by reproducing the deleted text of from node 108C in strikethrough font and using highlighting as desired.

Report 116 also explicitly shows that the position or location of from node 108D in from document 106 has changed or moved up in to document 112 as shown by the upwards slanted arrow. This is the case when one or more higher elements of from node 108D differ from the respective one or more elements of to node 114C while the rest of the respective elements underlying the higher elements of the two nodes match. In an exemplary scenario, this may be when <num> element of nodes 108B and 114B differ, while underlying <heading> and <content> elements match, or when <num> and <heading> elements differ and underlying <content> elements match. Such a move may be shown in report 116 by reproducing the matching text of from/to nodes along with strikethrough font for the textual differences of the differing elements, if any, of from/to node 108D/114C and using highlighting as desired.

Report 116 also explicitly shows that the position of from node 108E in from document 106 has changed or moved up in to document 112 as shown by the upwards slanted arrow. This is similar to the above case with the difference being that from node 108E has also been changed/modified to to node 114D' as indicated by the prime "'". Such a scenario occurs when one or more higher elements of from node 108D differ from the respective one or more elements of to node 114C while the rest of the respective elements underlying the higher elements of the two nodes just approximately or significantly match. In an exemplary scenario, this may be when <num> element of nodes 108B and 114B differ, while underlying <heading> and <content> elements approximately match, or when <num> and <heading> elements differ and underlying <content> elements approximately match.

Once again, the reader is reminded that by matching here, we may mean exact matching or only approximate/significant matching depending on the implementation. Therefore, in the present example we may mean that the texts of the to node element <content> and/or <heading> is close enough that this is considered a move for from/to nodes 108E/114D', rather than a deletion of from node 108E and an insertion of to node 114D'. Such a move may be shown in report 116 by reproducing the matching text of from/to nodes along with strikethrough font for the textual differences of the differing elements of from/to node 108D/114C and using highlighting as desired.

Report 116 also explicitly shows that to node 114E has been inserted into to XML document 112 and consequently into document 112. This is shown by the symbol "X" and the arrow in FIG. 2. System 100 determines a to node to be inserted into the document, when there is no matching from node in the from document. This will be the case when none of the elements in the to node match in at least an approximate or significant way per above explanation, any of the corresponding elements in any of the from nodes in from XML document 106 and consequently selection 108. An inserted to node may be shown in report 116 by reproducing the texts of all the elements of the to node with underlining and using highlighting as desired.

Figure 3:
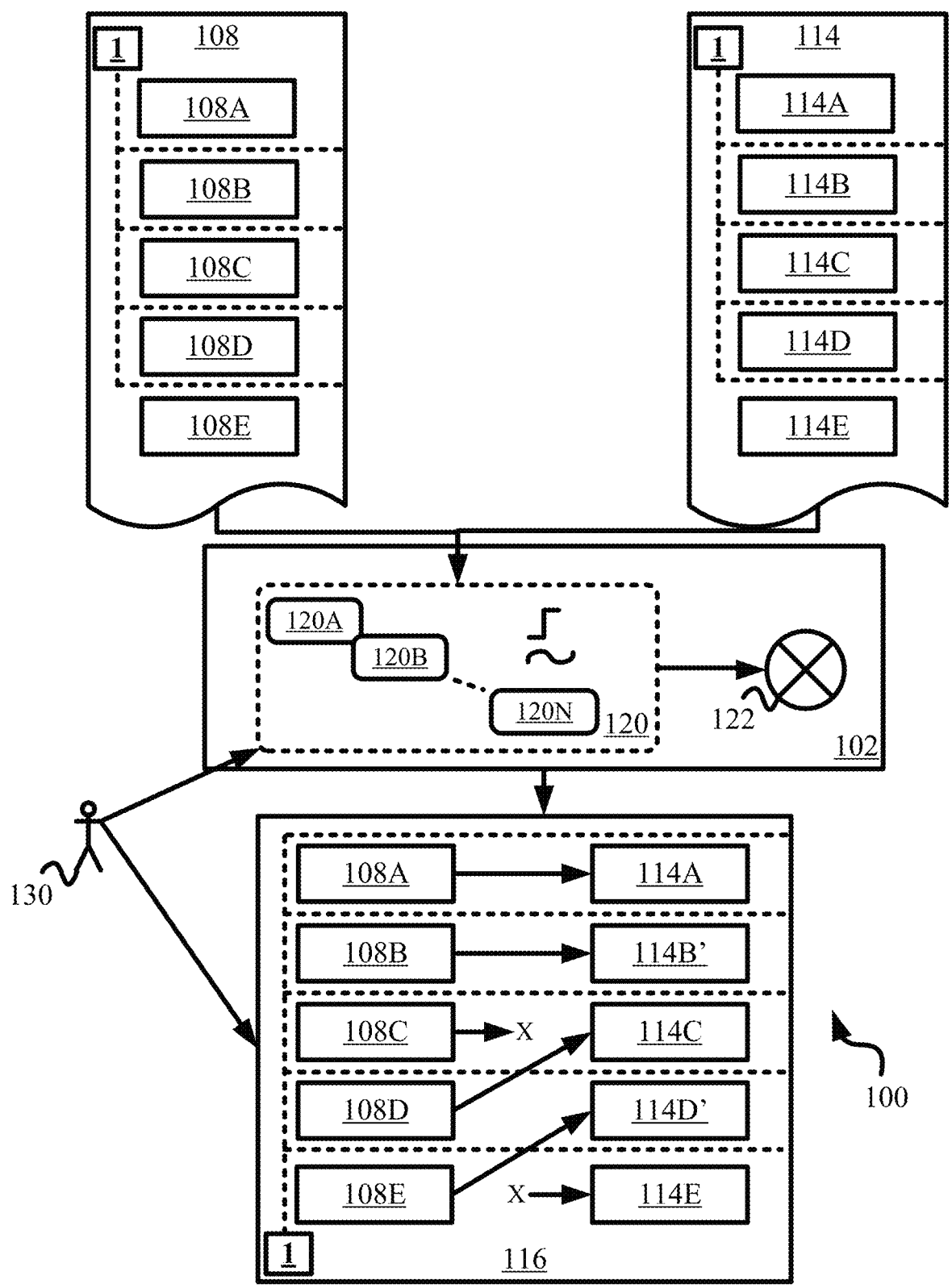
FIG. 3 shows a more detail view of the diagram of FIG. 2, expanding on the functionality of the document comparison engine of the present teachings.

As noted earlier, report 116 shown in FIG. 112 per above teachings has not been achievable using the techniques known in prior art. Such a report is particularly useful to show differences in documents where nodes or sections/provisions may not appear in the same order in the from and to documents, and where it may be valuable to summarize the changes that take place between the from and to documents. To further understand how comparison engine/module 102 of document comparison system 100 of FIG. 2 produces report 116, let us turn to the detailed embodiment shown in FIG. 3 in conjunction with flowchart 200 shown in FIG. 4. In particular, FIG. 3 shows details behind document comparison module/engine 102 of our document comparison system 100. As such, several of the drawing elements and corresponding reference numerals are drawn from FIG. 2 while others have been left out to avoid detraction.

Figure 4:
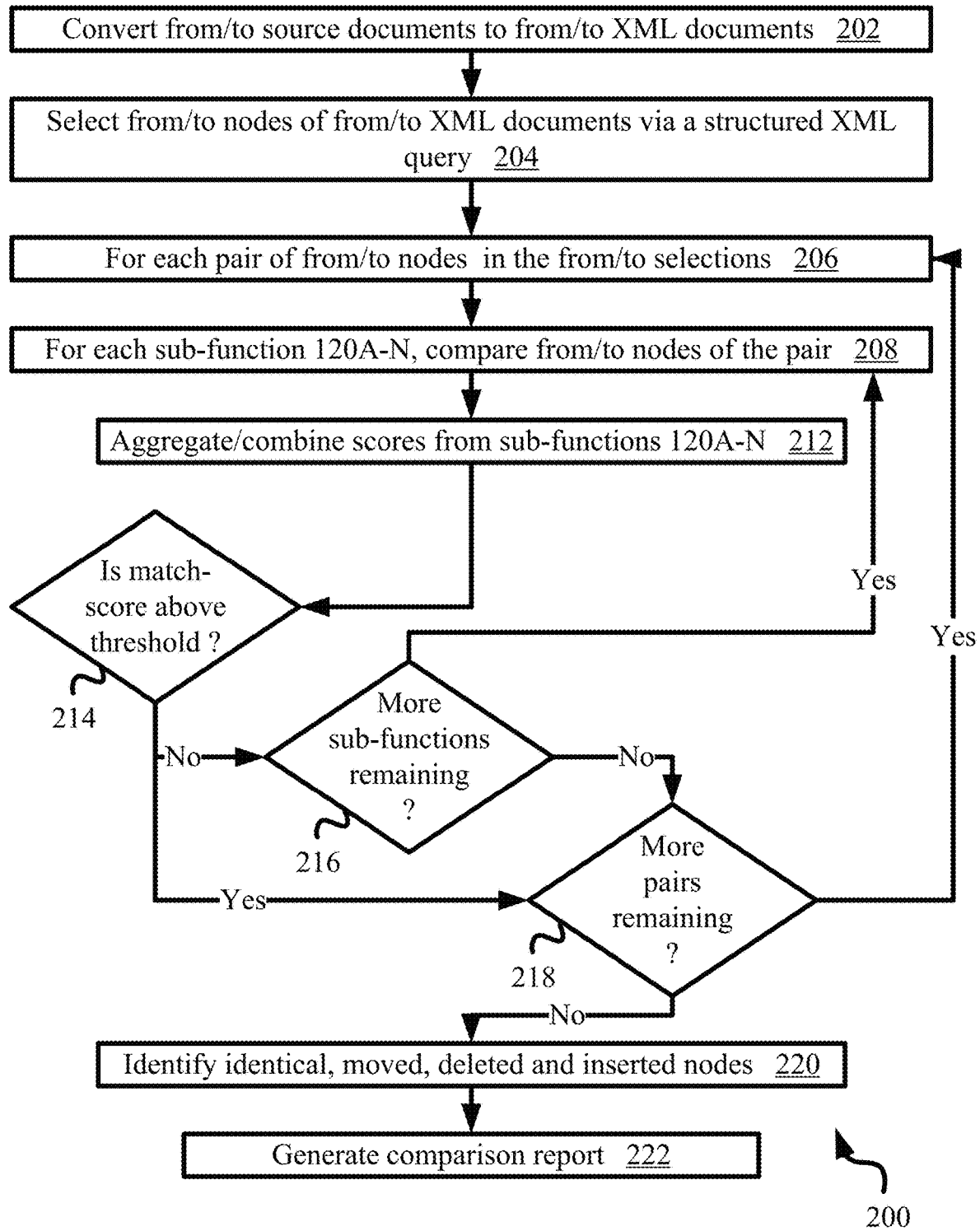
FIG. 4 shows the steps carried out by embodiments of the present design in a flowchart form.

FIG. 4 shows the flow diagram or process flow or the steps executed by comparison system 100 according to the present techniques. Recall that comparison engine or module 102 compares from document 108 with its from nodes 108A-E with to document 114 with its to nodes 114A-E to produce report 116. In order to accomplish its objectives, document comparison engine 102 takes advantage of a set or library 120 of sub-functions 120A, 120B, ..., 120N. Engine 102 compares one or more from nodes 108A-E with one or more to nodes 114A-E using one or more sub-functions 120A-N of library/set 120 as shown in FIG. 4.

First, as per above explanation in reference to FIG. 2, from/to source documents 104/110 are converted to their XML representations/documents 106/112 respectively. This is shown by block 202 of flowchart 200. Then, from/to nodes 108A-E and 114A-E are selected for comparison using an XPath, XQuery or some other structured XML query expression from from/to XML documents 106/112 to produce from/to selections or documents 108/114. This is shown by block 204 of FIG. 4. Recall, that each element of the XML documents 106/112 may be considered a node in the object model representation of the documents. Therefore, it is important that a proper determination of the level of the from/to nodes selected by XPath be made upfront.

For example, in a given implementation, such as for a legal domain the most relevant level for comparison may be the section level. In such a scenario, the sections of the original from/to source documents can be represented by <section> elements of the from/to XML representations 106/112. Therefore, XPath selector would select the desired sections or nodes within the <section> elements of from/to XML representation/documents 106/112 as nodes 108A-E/114A-E into XML selections/documents 108/114 respectively.

Alternatively, for court opinions, the most relevant level for comparison may be the paragraph level. In such a scenario, the paragraphs of the original from/to source documents can be represented by <paragraph> or <para> elements of the from/to XML representations 106/112. Therefore, XPath/XQuery selector would select the desired paragraphs or nodes within the <paragraph> elements of from/to XML representation/documents 106/112 as nodes 108A-E/114A-E into XML selections/documents 108/114 respectively. The reader will appreciate that actual tag name of the XML elements used above may be selected as desired. For example, a section may also have tags <sec></sec>, and a paragraph may use tags <para></para>. The choice of the most relevant level for comparison for a given implementation may be made using a user-defined variable in the software code. Such a variable may also be set in a configuration file.

We will provide the below explanation using our above example of a legal domain. This disclosure adequately equips a person of average skill to easily apply the teachings disclosed to other domains. Now, continuing with flowchart 200 of FIG. 4, once from/to nodes 108A-E/114A-E have been selected using XPath per block 204, starting from the 1st from node of from XML document/selection 108, each to node of to XML document 114 is compared to that from node.

For example, starting with from node 108A, each of to nodes 114A-E is compared to from node 108A in a pairwise fashion. This pairwise comparison can be thought of as comparing from/to nodes in each pair (108A, 114A), (108A, 114B), (108A, 114C), (108A, 114D), (108A, 114E), followed by comparing from/to nodes in each pair (108B, 114A), (108B, 114B), (108B, 114C), (108B, 114D), (108B, 114E), and so on. The selection of each such pair is shown by block 206 in FIG. 4.

According to the present techniques, the from/to nodes of each pair are then compared using sub-functions 120A-N. The comparison by each sub-function or simply function results in a score. For example, from/to nodes 108A, 114B of above pair (108A, 114B), is attempted to be compared using each of sub-functions 120A, 120B, . . . , 120N, and a score obtained from each comparison. This is shown by block 208 in flowchart 200. In the preferred embodiment, sub-functions 120A-N are selected based on the domain of the from/to documents 108/114. The present techniques are agnostic of the specific domains to which from/to documents belong. As such, the present techniques may be practiced for a variety of domains including but not limited to legal, legislative, intellectual property, medical, technical, scientific, business, real-estate, literary, music, philosophical and religious domains, fields or professions.

Consequently, sub-functions 120A-N may be chosen that are applicable to a specific domain for which the techniques are being practiced. Sub-functions 120A-N are called with specific from/to XML elements or nodes as arguments. A caller function that applies all sub-functions 120A-N may be used for that purpose. Therefore, the caller function may be called with the above explained arguments, that in turn applies or calls sub-functions 120A-N with the same arguments until the overall/aggregate score reaches above a matching-threshold and as explained below.

In one embodiment, sub-function 120A may simply textually compare the tags of from/to nodes passed to it. This is useful to ensure that XML tags, for example <section></section>, of from/to nodes 108A-E/114A-E match. This may also be useful when XML document 108 uses tags <section></section> while to XML document 114 uses different tags <sec></sec> to enclose sections. In such a case, a curator or a machine learning algorithm may adjust/select sub-function 120 and it score so that these tags are determined to be a match.

Any of from/to nodes 108A-E, 114A-E may have the following exemplary structure and content:

From Node 108A-E:
 <section
  id="H7D2B956E114C496483E0D17B57E0306C"
  class="bill-dtd-OLC" identifier="Identifier A">
  <num value="1">Section 1.</num>
   <heading>Short From title 1</heading>
    <content>This Act may be cited as the Protecting American Talent and Entrepreneurship Act of 2015 or the PATENT Act.
    </content>
 </section>
To Node 114A-E:
 <section
  id="H7D2B956E114C496483E0D17B57E0306C"
  class="bill-dtd-OLC" identifier="Identifier A">
  <num value="2">Section 2.</num>
   <heading>Short To title 1</heading>
    <content>This Act may be cited as the Protecting American Talent and Entrepreneurship Act of 2015 or the PATENT Act.
    </content>
 </section>

The above from/to nodes reside within <section></section> tags as shown. Thus, in the above example, XPath or another structured XML query selector would select XML elements contained within the desired <section></section> tags or more simply stated, the selector would select the desired <section> elements of the from/to XML documents. Thus, sub-function 120A may be called with arguments as the from/to <section> elements provide above. Individual from/to <section> elements may be identified using the "id" attribute shown.

In one embodiment, the score returned by sub-function 120A is 0.5 if there is a match, and 0 otherwise. Since generally, any element of the from/to XML documents may be passed on as an argument to sub-functions 120A, if sub-function 120A were to be called on element or node <heading> of from node to compare with element <num> of to node, it will return a score of 0, since tagName <heading> is not the same as tagName <num>. If however, function 120A is called on <section> elements of both from and to nodes, it will return a higher score, for example, 0.5.

In the same or another embodiment, sub-function 120B compares the text contents of the from/to elements passed to it as arguments and all respective underlying elements. This sub-function thus effectively checks for identical text contents. If called with from/to <section> elements/nodes as arguments, sub-function 120B would remove all XML tags and textually compare entire contents (including contents of any underlying elements) below <section> element of from node 108A with the entire contents (including the contents of any underlying elements) below <section> element of to node 114B and return a score based on this comparison. In one embodiment, the sub-function returns a score of 1 if the contents match, and 0 otherwise.

In the same or another embodiment, sub-function 120C may be a variation of sub-function 120B but excluding any underlying <num> element from the comparison. In the exemplary XML nodes provided above, if sub-function 120C is called on the two from/to <section> elements, then the texts "Section 1." and "Section 2." of respective from/to <num> elements of the from/to nodes contained within <num></num> tags will be excluded from comparison while all other text within any underlying XML <elements> will be compared. As before, the surrounding XML <elements> are removed first before textual comparison and replaced afterwards. Thus, text "Short From title 1" is compared to "Short To title 1", and the texts within respective <content> elements is compared. In one embodiment, sub-function 120C returns a score of 1 if the text contents above match, and 0 otherwise.

In yet another or the same embodiment, sub-function 120D may be another variation of sub-function 120B but excluding any underlying <num> element as well as <heading> element from comparison. In one embodiment, the sub-function returns a score of 1 if there is a match, and 0 otherwise. In the same or a different embodiment, sub-function 120E matches the headings and the values of "identifier" attributes of the from/to elements or nodes passed to it as arguments. In this case, text between <heading></heading> tags will be compared, as well as the value of "identifier" attribute in the respective elements passed as argument. In the above exemplary nodes, if sub-function 120E is called on the respective from/to sections or nodes, the value of "Identifier A" within from <section> element is compared to the value of "Identifier A" within to <section> element and match is observed. In one embodiment, the sub-function returns a score of 1 if the text in the respective <heading> elements and the values of respective "identifier" attributes match, and 0 otherwise.

In yet another or the same embodiment, sub-function 120F compares sorted N-grams of the from/to nodes or more specifically the respective from/to elements passed onto function 120F for comparison. This sub-function thus effectively checks if a phrase of a certain length (for example 20 words) is shared between the nodes. The sub-function then returns a score of 1 if there is a match, and 0 otherwise. In yet another or the same embodiment, sub-function 120G compares longest common distance between the words of the from/to nodes or elements. The sub-function then returns a score between 0 and 1 depending on the length of the longest common distance. In still other embodiments, sub-functions 120A-N may be any other type of comparison operation chosen for a specific domain of the from/to documents.

For example, the comparison operation may use a step function that returns a value of 1 for a match between the texts of the from/to nodes, and 0 otherwise. Such a step function is indicated by the step ladder in library/set 120 of FIG. 3. As another example, a sub-function may use a comparison operation that follows a sine wave and returns a value of 1 for a match between the from/to nodes, and a range of values between 0 and 1 following a sine wave, based on the number of words matched in the contents of the from/to nodes. Such a sine wave is also indicated by the sine wave in library/set 120 of FIG. 3. Still other variations of sub-functions 120A-N for various implementations of the present techniques are conceivable, such as a sigmoid function. In general, sub-functions that test a true or false proposition may return a value of 0 or 1 while other sub-functions that measure similarity or a non-binary quality may return a value between 0 and 1 inclusive.

As noted, the above-described pairwise matching of the from/to nodes or elements for each pair of by sub-functions 120A-N is shown by block 208 in FIG. 4. The scores returned from each sub-function 120A-N are then combined or aggregated to form a match-score that is assigned to the corresponding pair. This aggregation or combination function or operation is represented by circle and cross 122 shown in FIG. 3 and by block 212 of FIG. 4.

In one embodiment, the score from sub-functions 120A-N are simply added to form the match-score for the pair and in such a scenario operation 122 is simply an addition. Alternatively, operation/function 122 may be a more complex aggregation of the individual scores returned by sub-function 120A-N. In a highly preferred embodiment, different weights may be assigned to the scores returned by individual sub-functions and then match-score is computed as a weighted-average of all the weighted-scores. The weights may be initially assigned by a human curator/user who is an expert in the domain of the documents being compared. In the above example, a match returned by sub-function 120B may be multiplied by a higher weight than sub-function 120C, for instance.

The choice of matching sub-functions 120A-N is essential to determining the semantic relevance of the matches. The individual sub-functions to use, their combination and the above-explained weights assigned to each function, are initially determined by an curator/expert in the field or domain from which from/to documents 104/110 are drawn. In comparing legislative documents, for instance, the sub-functions will consider features that legislative drafters consider in determining if two levels match. This may include general functions, such as matching text in the headings, and more specific ones, such as giving more weight to matches where both nodes or provisions have the word "appropriation" in the heading, or which contain a specific legal phrase or a keyword, for example, "prior art".

It should be noted that the matching of the pairs of from/to nodes may compare each to node to each from node, or each from node to each to node. The former approach is used by the preferred embodiment and produces comparison summary and detailed report that are centric to the final to document and show the changes performed to arrive at it. The latter and equivalent approach is used by other embodiments, where the results are centric to the from document and the changes applied to it.

In any event, the match-score is computed as an aggregation of the individual scores returned by sub-functions 120A-N as given by block 212 of flowchart 200 and per above explanation. Once the match-score of a pair reaches above a matching-threshold, the pair of from/to nodes or elements are determined to be a match and further matching with additional sub-functions 120A-N is stopped leading to computational efficiency of the design. The same process is repeated for all other pairs of from/to nodes or elements.

In other words, and as shown by decision diamonds 214, 216 and 218 in FIG. 4, sub-functions 120A-N are successively called for each pair, until the match-score of the pair is above the matching-threshold, in which case the pair of from/to nodes is determined to be a match and further matching of the respective from/to nodes is stopped. Otherwise, matching continues up until all sub-functions 120A-N have been exhausted, in which case, the pair is determined to be a mismatch. The above process is repeated for all pairs of from/to nodes 108A-E and 114A-E respectively until matching is stopped per above, or until a match-score (0 or greater) has been assigned to the pairs.

In highly useful alternative embodiments, all mismatched pairs that have a match-score above a secondary-threshold are still considered "potential" or "possible" matches. In such a scenario, the mismatched pair with the highest match-score that is > secondary-threshold is designated as a match with the rest of the present teachings applying as in other embodiments. Further, a ranked list of all potential matches may also be preferably presented in report 116.

Now, the system identifies identical, moved, changed, deleted and inserted nodes from the from document to the to document. This is shown by block 220. Expanding on our earlier teachings in reference to FIG. 2, this is accomplished as follows:

1. Identical match: Depending on the implementation, the weights of sub-functions 120A-N may be so defined that match-score of a pair of from/to nodes>=matching-threshold only if texts contained within the pair of from/to nodes as well as a desired choice of underlying nodes or elements also match. This situation is considered as an identical match. Of course, the desired choice may be that every pair of underlying nodes match.

In related variations, an identical match may also have the requirement that additional relevant attributes of the from/to nodes being compared also match. For example, it may be required that "id" and/or "identifier" attributes of from/to <section> elements also match. This may signify that the from/to <section> elements also have the same position or location in their respective XML documents. Note that depending on the requirements of an implementation, a given from node can have a perfect match with one or more to nodes. Similarly, a given from node may not have a perfect match with any to node.

2. Moved nodes: This is a variation of the above case, when an identical match of from/to nodes is defined to require matching text contents as well as the same position/location in their respective XML documents. In such a situation, if a from node matches a to node with match-score>=matching-threshold but from/to nodes or elements have different positions/locations in the respective XML documents, then this is considered a move. More than one pairs of from/to nodes may satisfy the above criteria and can constitute potential or candidate moves that can be presented in report 116 to the user. In such a scenario, potential moves may be ranked according to their match-scores.

Depending on the implementation, a change of position/location may be signified by the change of a specific element or elements between the from/to nodes. For instance, in the above exemplary from/to nodes provided, if the value of attribute "id" in <section> element and/or the text of element <num> changes between the from/to nodes then this may signify that the position/location of the section has changed. As noted in reference to FIG. 2, a move may also be accompanied by textual changes that are not significant enough to cause a mismatch between the from/to nodes being compared and/or any number of their underlying nodes/elements.

3. Changed nodes: This is also a variation of (1) above but where the from/to nodes do not satisfy the requirements of an identical match for the given implementation. In other words, the match-score of the from node to the to node>0 but less than the matching-threshold value. This means that some changes have been applied to the from node to yield the to node. These changes can be inspected by considering the weights and scores of the sub-functions and by calculating a text difference between the two nodes.

Depending on the implementation, additional information may be extracted about the changes, which can be included in report 116. For example, a sub-function may track whether certain domain-specific information has been changed in the from node, for example, the effective date of a provision, while other information has remained unchanged. In report 116, this may be indicated as "Effective date changed".

4. Deleted nodes: If for a from node the match-score=0 for every to node, then this indicates that this from node has been deleted from the to XML document. In other embodiments, a ranked list of potential matches to the to nodes may be presented to the user in report 116 as potential alternatives to the deletion of the from node.

5. Inserted nodes: Conversely to above, if for a to node the match-score=0 for every from node, then this indicates that this to node has been inserted into the to XML document. In other embodiments, a ranked list of potential matches to the from nodes may be presented to the user in report 116 as potential alternatives to the insertion of the to node.

Finally, the above information along with appropriate markings per above teachings is shown in comparison report 116 of FIG. 3, and as indicated by block 222 in FIG. 4. In the preferred embodiment, a human curator is allowed via preferably an appropriate graphical user interface built with techniques known in the art, to manually override and thus alter the above automatic identification of matched, moved, deleted and inserted nodes.

Thus, the human curator can provide an overriding-input to report 116 indicating if a pair of from/to nodes are a match or not, or whether a from node has indeed moved to a to node and if not, then to which to node it has moved to (if at all). Similarly, the human curator/expert can inform the system via an overriding-input, if the identified from node has indeed been deleted in the to document, or which from node (if any) has been deleted, or if the identified to node has indeed been inserted in the to document, or which to node (if any) has been inserted.

The particular matching functions, and associated weights and thresholds, will be determined prior to running document matching/comparison system 100, and will generally differ for documents from different domains. In addition, and as already noted, the choice and number of relevant hierarchical levels to compare will also differ and may be set using a variable or a configuration. Thus, the relevant set of matching criteria, weights and matching-threshold may be stored as a configuration to apply to a particular class of documents. For example, a certain configuration may be applied to bills in the U.S. Congress, while others may be applied to amendment documents, and yet others to after-patient memos in a medical office. The configuration may also depend on the individual preferences and judgement of a user, thus allowing different users to produce a different comparison document from the same input documents.

Let us take yet another concrete example, to explain the present techniques in even greater detail. For this purpose, let us again revisit Table 1 originally presented in the Background section and reproduced below.

TABLE 1

| From document | To document |
| --- | --- |
| A. Definitions.-- | A. Purpose.-- |
| "Citizen" means an | The purpose of this law is to |
| individual who has all | define the eligibility |
| of the rights of | criteria for becoming a |
| citizenship. | citizen. |
| "Resident" is a person | B. Definitions.-- |
| who lives in this | "Citizen" is a person who |
| country for more than | meets the requirements of |
| six months of the year. | section XXX of the |
| B. Effectivity.-- | Constitution. |
| These provisions will | "Resident" is a person who |
| become effective on the | lives in this country for |
| first day of the year | more than six months of the |
| two-thousand twenty. | year. |
| C. Application for | C. Becoming a Citizen.-- |
| Citizenship.-- | After two years of continuous |
| A resident may apply to | residence, a resident may |
| become a citizen after | apply for citizenship. |
| two years of continuous | D. Effectivity.-- |
| residence. | These provisions will become |
| | effective on the first day of |
| | the year two-thousand twenty. |

Table 2 below provides the corresponding from/to XML representations/documents of the above exemplary from/to source documents.

TABLE 2

| From XML document | To XML document |
|---|---|
| `<fragment>`<br>    `<level meta="depth_0" identifier="A. ">`<br>        `<num value="A. ">A.</num>`<br>        `<heading type="inline">Definitions.</heading>`<br>        `<content>`<br>            `<p>`"Citizen" means an individual who has all of the rights of citizenship.`</p>`<br>            `<p>`"Resident" is a person who lives in this country for more than six months of the year.`</p>`<br>        `</content>`<br>    `</level>`<br><br>    `<level meta="depth_0" identifier="B. ">`<br>        `<num value="B. ">B.</num>`<br>        `<heading type="inline">Effectivity.</heading>`<br>        `<content>`<br>            `<p>`These provisions will become effective on the first day of the year two-thousand twenty.`</p>`<br>        `</content>`<br>    `</level>`<br><br>    `<level meta="depth_0" identifier="C. ">`<br>        `<num value="C. ">C.</num>`<br>        `<heading type="inline">Application for Citizenship.</heading>`<br>        `<content>`<br>            `<p>`A resident may apply to become a citizen after two years of continuous residence.`</p>`<br>        `</content>`<br>    `</level>`<br>`</fragment>` | `<fragment>`<br>    `<level meta="depth_0" identifier="A. ">`<br>        `<num value="A. ">A.</num>`<br>        `<heading type="inline">Purpose.</heading>`<br>        `<content>`<br>            `<p>`The purpose of this law is to define the eligibility criteria for becoming a citizen.`</p>`<br>        `</content>`<br>    `</level>`<br><br>    `<level meta="depth_0" identifier="B. ">`<br>        `<num value="B. ">B.</num>`<br>        `<heading type="inline">Definitions.</heading>`<br>        `<content>`<br>            `<p>`"Citizen" is a person who meets the requirements of section XXX of the Constitution.`</p>`<br>            `<p>`"Resident" is a person who lives in this country for more than six months of the year.`</p>`<br>        `</content>`<br>    `</level>`<br><br>    `<level meta="depth_0" identifier="C. ">`<br>        `<num value="C. ">C.</num>`<br>        `<heading type="inline">Becoming a Citizen.</heading>`<br>        `<content>`<br>            `<p>`After two years of continuous residence, a resident may apply for citizenship.`</p>`<br>        `</content>`<br>    `</level>`<br>    `<level meta="depth_0" identifier="D. ">`<br>        `<num value="D. ">D.</num>`<br>        `<heading type="inline">Effectivity.</heading>`<br>        `<content>`<br>            `<p>`These provisions will become effective on the first day of the year two-thousand twenty.`</p>`<br>        `</content>`<br>    `</level>`<br>`</fragment>` |

According to the present techniques, the above from/to nodes within <level></level> tags are first selected from potentially larger from/to XML documents using an XPath or alternative structured XML query expression. An exemplary query expression may look like "/Constitution/section/clause/level[@meta='depth_0']", which would select all levels at a depth of 0 from a larger from/to documents into the above exemplary <fragment></fragment> tags for comparison. In the embodiment shown, query selection selects specific from/to nodes or levels from respective XML documents 106 and 112 and places these selections within <fragment></fragment> tags for comparison. These selections are referenced by respective numerals 108/114 in FIGS. 2-4 and associated teachings.

Now, each from node within <level></level> tags of the from XML document above is compared to each to node within <level></level> tags of the to XML document above. The comparison is performed by invoking various matching sub-functions 120A-N (see FIG. 3) and may include matching the text contents of <num> element and/or <heading> element as well as <content> element per above teachings. In addition, any desired number of relevant attributes may also be compared. An override function in the code can also be provided that signals a match if any two nodes have the same heading, or if the two headings contain a particular keyword (e.g. "Definition"). Such an override function may assign a large weight to the score of the sub-function that scores the match of <heading> elements.

After each pair or combination of from/to nodes have been scored by sub-functions 120A-N of above teachings, a match-score is computed based on aggregation of the scores returned by individual sub-functions of the above teachings. Based on the match-score of each pair, the top ranked matches are selected and presented in an comparison summary of the changes. For the above exemplary from/to XML documents, an initial automatic version of such a comparison summary may be as follows:
[NONE]→[section A]: Insertion
[section A]→[section B]: Headings match, moved and edited
[NONE]→[section C]: Insertion
[section B]→[section D]: Headings match, moved
[section C]→[NONE]: Deletion The comparison summary generated based on present techniques is already significantly more useful than a naive textual or string comparison of the prior art that was shown in FIG. 1A. Furthermore, upon inspection, a human user(s) may note that section 3 of from document ("Application for Citizenship") is a semantic match for section 3 of to document ("Becoming a Citizen"). As such, the human user(s)/curator(s) can provide overriding-input(s) to adjust the above matches identified by system 100. For future comparisons, the weights and matching functions may be adjusted to better capture a match like this one.

Now, comparison summary is even more precise and useful and is as follows:
[NONE]→[section A]: Insertion
[section A]→[section B]: Headings match, moved and edited
[section C]→[section C]: Overriding-input based match
[section B]→[section D]: Headings match, moved In the preferred embodiment, comparison report 116 of FIG. 2-4 consists of two parts. First is a comparison summary that summarizes or annotates the changes to the various nodes between the from/to documents, and as explained above in reference to the example of Table 2. The comparison summary may show that section 1 is unaltered, section 2 is deleted, section 3 is moved to section 2 and has its heading changed, and section 4 is new. For a comparison of large documents, such a comparison summary provides a very helpful guide for semantically understanding the changes due to revisions in the document.

The second part of comparison report 116 is a detailed report presenting the changes in the entire document in an expanded form. Preferably, the user is able to expand the comparison summary to arrive at the detailed report, either by clicking on each node/section/provision or the appropriately selected level of XML documents, or as a whole by a single click, and vice versa. Alternatively, or in addition, comparison report 116 may also contain a third part that is a "comparison document" which shows each pair of matching from/to sections or elements that are considered a match along with their match-score in ranked order.

For the above example, comparison report 116 is shown in FIG. 5 as a screenshot. Notice the difference between report 116 as presented in FIG. 5 and that available from the techniques of prior art as shown in FIG. 1A. While still technically valid, report 10 of FIG. 1A does not inform the drafters of the documents in a semantically relevant manner, as to which sections of the document have been edited/modified, moved, inserted and deleted in its various versions. For instance, notice the unnecessary and confusing deletion and insertion of "Definitions" section in FIG. 1A. As a result, the writers/drafters are left with rewriting entirely new sections or worse losing track of important changes to the contents/sections that may have been contributed over time.

Exemplary instant code in Javascript for matching functions/sub-function 120A-N of FIGS. 3-4 and associated teachings is presented below. The module provided may be used to score all possible pairs of from/to nodes within selected from/to elements using the set or library of matching sub-functions provided. The code also shows a set of user-defined overrides to establish a match based on the scores returned by specific sub-functions. As noted, the results are presented in a report to the user, who may manually override the automated matches via overriding-inputs. The technical design and code for inputting/editing overriding-inputs through an appropriate user interface will be appreciated by those skilled in the art and is not provided explicitly in this disclosure. The code also presents an exemplary caller routine that utilizes the code provided in the matching module.

```
matcher.js:
'use strict';
/** A module that contains methods for finding matched provisions between two
documents. Copyright 2018 Xcential Legislative Technologies **/
const defaultOverrides = {
        USERMATCHSCORE: 2.0, NOMATCHSCORE: 0, TEXTCONTENTSCORE: 1.5,
TEXTMINUSNUMCORE: 1.4, TEXTMINUSNUMHEADINGSCORE: 1.35,
HEADINGSIDENTIFIERSCORE: 1.3, NGRAM30SCORE: 1.25, NGRAMSCORE: 1.2 };
/** Calculates similarity score between two provisions.
 * @param {ProvisionNode} node1, @param {ProvisionNode} node2
 * @param {Array} [matchFns] Array of matching functions and their scores
 * @returns {Number} Score value between 0 (no match) and 1 (exact match) **/
export default function match(node1, node2, matchFns) {
        matchFns = matchFns || createDefaultMatcher( );
        let score = 0;
        let weightsum = 0;
        for (const item of matchFns) {
                const matchScore = item.compare(node1, node2, item.options);
                if (matchScore >= 1) {
                        return { override: item.compare.name };
                }
                if (!matchScore || matchScore <= 0) {
                        return null;
                }
```

```
                weightsum += item.weight;
                score += item.weight * matchScore;
        }
                return { matchScore: score / weightsum }; }
/** Creates default matching functions to be used in 'match' function **/
export function createDefaultMatcher( ) {
        return [{ compare: matchElementType, weight: 0.01
        }, { compare: matchTextContent, weight: 0.06
        }, { compare: matchTextMinusNum, weight: 0.04
        }, { compare: matchTextMinusNumHeading, weight: 0.02
        }, { compare: matchHeadingsAndIdentifier, weight: 0.24
        }, { compare: matchNGram, weight: 0.17, options: { n: 30, maxThreshold:
1 }
        }, { compare: matchNGram, weight: 0.21, options: { n: 4 }
        }, { compare: matchLCS, weight: 0.25, options: { maxThreshold: 0.5 } }]; }
/** Compares node name of given provision nodes
 *  @param {ProvisionNode} node1, @param {ProvisionNode} node2, @returns
{Number} **/
export function matchElementType(node1, node2) {
        return node1.tagName && (node1.tagName === node2.tagName) ? 0.5 : 0;}
/** Compares content of given nodes
 *  @param {ProvisionNode} node1, @param {ProvisionNode} node2, @returns
{Number} **/
export function matchTextContent(node1, node2) {
        return node1.content === node2.content ? 1 : 0;}
/** Compares content of given nodes
 *  @param {ProvisionNode} node1, @param {ProvisionNode} node2, @returns
{Number} **/
export function matchTextMinusNum(node1, node2) {
        return node1.contentWithout('num') === node2.contentWithout('num') ? 1 :
0;}
/** Compares content of given nodes
 *  @param {ProvisionNode} node1, @param {ProvisionNode} node2, @returns
{Number} **/
export function matchTextMinusNumHeading(node1, node2) {
        return node1.contentWithout('num', 'heading') ===
node2.contentWithout('num', 'heading') ? 1 : 0;}
/** Compares headings of given nodes
 *  @param {ProvisionNode) node1, @param {ProvisionNode) node2, @returns
{Number} **/
export function matchHeadings(node1, node2) {
        return node1.heading === node2.heading ? 1 : 0;}
/** Compares headings and identifiers of given nodes
 *  @param {ProvisionNode} node1, @param {ProvisionNode} node2, @returns
{Number} **/
export function matchHeadingsAndIdentifier(node1, node2) {
        return node1.heading === node2.heading && node1.identifier ===
node2.identifier ? 1 : 0;}
/** Calculates match score by comparing sorted N-grams of given provisions
 *  @param {ProvisionNode} node1, @param {ProvisionNode} node2, @param {Object}
[options], @return {Number} **/
export function matchNGram(node1, node2, options) {
        if (!node1.content || !node2.content) {
                return 0;}
        const opt = Object.assign({ n: 4 }, options);
        const r = nGramIntersect(node1.ngram(opt.n), node2.ngram(opt.n));
        if (r.intersectLength === 0) {
                return 0;}
        // Absolute number of ngram matches, beyond which the items match.
        if (r.intersectLength > opt.maxThreshold) {
                return 1;}
        return scaleNgramScore(r.intersectLength, r.maxLength);}
/** Calculates match score by comparing longest common distance between words
of given sections
 * @param {ProvisionNode} node1, @param {ProvisionNode} node2, @param {Object}
options, @return {Number} **/
export function matchLCS(node1, node2, options) {
        const opt = Object.assign({ maxThreshold: 0.5 }, options);
        // NOTE: lcs by words is much faster, but a bit less accurate
        const r = lcs(node1.words, node2.words, opt);
        if (!r || !r.length || r.length < 1) {
                return 0;}
        return r.length / Math.min(node1.content.length, node2.content.length);}
/** Returns common parts of two sorted array
 * @param {Array} array1, @param {Array} array2, @return {Array} **/
function sortedArrayIntersection(array1, array2) {
        let i = 0, j = 0, result = [ ];
        while (i < array1.length && j < array2.length) {
                if (array1[i] === array2[j]) {
```

```
                // This is in the intersection
                result.push(array1[i]);
                i++; j++;
            } else if (array1[i] < array2[j]) {
                // array2 is ahead, advance array1
                i++;
            } else {
                // array1 is ahead, advance array2
                j++;}
            // Handle duplicates
            if (i > 0 && array1[i] === array1[i - 1]) {
                i++;
            }
            if (j > 0 && array2[j] === array2[j - 1]) {
                j++;
            }}
        return result;}
/** Boosts the value of smaller results, since 10% match of ngrams probably
makes a better score than .1 would reflect
 * @param {Number} intersectLength, @param {Number} maxLength, @return {Number}
**/
function scaleNgramScore(intersectLength, maxLength) {
        return Math.min(Math.exp(intersectLength / maxLength) - 1, 1.05);}
/** Returns number of intersecting N-grams of two strings
 * @param {String[ ]} ngrams1, @param {String[ ]} ngrams2, @return {Object} **/
function nGramIntersect(ngrams1, ngrams2) {
        return {
                intersectLength: sortedArrayIntersection(ngrams1, ngrams2).length,
                maxLength: Math.min(ngrams1.length, ngrams2.length)
        };}
/** Returns longest common subsequence of two arrays
 * @param {Array} a, @param {Array} b, @return {Array} **/
function lcs(a, b) {
        const m = a.length;
        const n = b.length;
        let c = Array(m + 1).fill([0]);
        c[0] = Array(n).fill(0);
        for (let i = 0; i < m; i++) {
                for (let j = 0; j < n; j++) {
                        c[i + 1][j + 1] = a[i] === b[j] ? c[i][j] + 1 : Math.max(c[i
+ 1][j], c[i][j + 1]);
                }}
        function bt(i, j) {
                if (i * j === 0) {
                        return '';
                }
                if (a[i - 1] === b[j - 1]) {
                        return bt(i - 1, j - 1) + a[i - 1];
                }
                return c[i][j - 1] > c[i - 1][j] ? bt(i, j - 1) : bt(i - 1, j);
        }
        return bt(m, n);}
caller.js:
'use strict';
import match, { createDefaultMatcher, matchHeadings } from './matcher';
// to call with the default weights
const m = match(section1, section2);
if (!m) {
    handleNoMatch( );
} else if (m.override) {
    handleExactSingleFunctionMatch(m.override);
} else {
    handleNormalMatch(m.match);}
// to call with an additional function
let matcher = createDefaultMatcher( );
matcher.push({
    compare: matchHeadings,
    weight: 0.9 });
match(section1, section2, matcher);
```

Let us now review even more examples that demonstrate the benefits of the present design over prior art. FIG. 6 presents an exemplary detailed comparison report 116 based on the present techniques corresponding to counterpart report generated by prior art presented earlier in FIG. 1B. It is apparent that detailed comparison report 116 is far superior and more useful to drafters of this document and the user of the present system, than the naively generated text differencing versions available in tools like Microsoft Word and the like of the prior art. Notice the unnecessary and confusing deletions and insertions in report 12 of FIG. 1B as compared to comparison report 116 of FIG. 6 of the present teachings. This is because, and as noted earlier, that when sections/provisions or other desired elements of relevance are moved and edited, standard comparison algorithms do not capture the relevance of these changes.

Similarly, FIG. 7A-9B provide screenshots from an implementation using exemplary documents in the legal domain compared using the present techniques. Specifically, FIG. 7A and FIG. 7B show a from source document 104 and its corresponding XML representation 106 respectively. Corresponding to FIG. 7A, FIG. 8A shows a to source document 110. FIG. 8B and FIG. 8C show corresponding XML representation 112 but which has been split into two successive parts 112A of FIG. 8B and 112B of FIG. 8C for better readability.

Finally, FIG. 9A shows a comparison summary 116A generated by the instant teachings disclosed above, whereas FIG. 9B illustrates a corresponding detailed report 116B also per above explanation. Once again, it is apparent that comparison summary and detailed report of FIG. 9A and FIG. 9B respectively are far superior and more useful to drafters of this document as compared to the corresponding naive comparison report 14 of the prior art shown earlier in FIG. 1C.

Specifically, in prior art report 14, the texts for inserted Section 1 in to document 110 and deleted Section 1B in from document 104 are incorrectly compared to changed Section 1A in to document 110. Further, the text of another inserted Section 2B in to document 110 is compared to moved Section 2A of from document 104. As apparent from FIG. 1C, such an approach altogether breaks the integrity of the comparison and makes no semantic sense of the changes that were made.

In contrast, instant comparison summary 116A of FIG. 9A precisely shows a list with section numbers of the deleted sections, inserted sections and changed sections based on above teachings. Further, detailed report 116B of FIG. 9B shows the actual inserted, deleted, moved and changed sections, along with the changes made. As can be seen, summary 116A and detailed report 116B are far more useful to the drafter(s) of the document in question, thus saving valuable resources and avoiding expensive mistakes. Moreover, summary 116A can be further customized depending on the domain to show the type of changes being made. For legislative bills, it could identify changes in "Short Title" and/or "Definitions" sections. For patent applications, it could identify, insertion, deletion, replacement or text edits of dependent claims, etc.

In other very useful and related variations, the overriding-inputs provided by one or more human curators/experts/users may also be used as inputs to one or more supervised machine learning algorithms. The supervised machine learning algorithms using techniques known in the art can then in the future automatically adjust the selection of matching sub-functions, their weights as well as the matching-threshold and/or secondary-threshold values above which the two nodes are considered a match and/or a possible/potential match respectively. Such machine learning algorithms may include linear regression, logistic regression, support vector machines (SVM), decision trees, random forests, neural networks and the like. The machine learning algorithms are preferably hosted on a server which receives the overriding-inputs from one or more clients operated by the one or more users.

In still other variations, the present techniques are extended to compare more than one from documents to a to document. The input or from documents are first converted to their XML representations out of which specific from nodes are selected and compared to the to nodes of the to document. As before, a structured XML query expression may be employed to select the desired nodes to be compared from the from and/or to XML representations. The only difference with the previous document comparison techniques is that the from nodes may be selected from one or more of the from XML representations of the from documents.

In still other variations, higher levels of a document may also be compared. For example, if sub-functions 120A-N are called with the <section> element or node, then higher-level elements (e.g. title headings, subtitle headings) may also be matched as well, and their matches may be weighted by the matches of the underlying nodes or elements. The choice of how to match the higher levels, will depend on how the final result should be displayed to show the comparison. This process can be continued until no higher-level elements are left. Such an approach allows one to completely reconstruct an entire to document by successively applying all the changes from the corresponding from document.

In still other variations, the user is able to annotate the summary report to provide explanation behind any overriding-inputs that are provided per above teachings and/or for other documentary reasons. For example, the user may explain that the domain-specific meanings of two different terms that are used as the headings of from/to nodes are the same, and that is the rational for the user to designate the two nodes as a match, or a move. Similarly, the user may explain that the domain-specific meanings of two almost identical terms that are used as the headings of from/to nodes are different, and that is the rational for the user to designate the from/to nodes as not a match or move, but rather an insertion or deletion. Thus, comparison report 116 may contain a combination of system generated annotations or remarks as well as annotations entered by the user.

The above teachings are provided as reference to those skilled in the art in order to explain the salient aspects of the invention. It will be appreciated from the above disclosure that a range of variations on the above-described examples and embodiments may be practiced by the skilled artisan without departing from the scope of the invention(s) herein described. The scope of the invention should therefore be judged by the appended claims and their equivalents.

The invention claimed is:

1. A system comprising computer-readable instructions stored in a non-transitory storage medium and at least one microprocessor coupled to said storage medium for executing said computer-readable instructions, said at least one microprocessor configured to:
   (a) establish a from XML representation of a from document and a to XML representation of a to document, said from XML representation and said to XML representation having a predetermined schema;
   (b) select using a structured XML query expression one or more from nodes in said from XML representation and one or more to nodes in said to XML representation;
   (c) compute a match-score as a function of one or more scores each of which is computed by a sub-function comparing at least one of said one or more from nodes to at least one of said one or more to nodes, said sub-function chosen according to a domain of said from document and said to document, wherein said domain is a legislative domain;
   (d) assign said match-score to one or more pairs, each of said pairs consisting of one of said one or more from nodes and one of said one or more to nodes;
   (e) determine corresponding said pair to be a match when said match-score is equal to or above a matching-threshold;

(f) produce a comparison report based on said match-score showing said one or more from nodes and said one or more to nodes;
(g) said sub-function configured to perform at least:
(h) match text contents of said at least one or more of said from nodes and of said at least one or more of said to nodes without matching corresponding numbers of said at least one or more of said from nodes and of said at least one or more of said to nodes;
(i) match text contents of said at least one or more of said from nodes and of said at least one or more of said to nodes without matching corresponding numbers and without matching corresponding headings of said at least one or more of said from nodes and of said at least one or more of said to nodes;
(j) match headings and identifiers of said at least one or more of said from nodes and of said at least one or more of said to nodes; and
(k) match sorted 30-grams of said at least one or more of said from nodes and of said at least one or more of said to nodes.

2. The system of claim 1, wherein said one or more from nodes and said one or more to nodes each comprise an XML element, its text contents and any relevant attributes.

3. The system of claim 2, wherein said one or more from nodes and said one or more to nodes each further comprise one or more underlying XML elements, their text contents and any relevant attributes.

4. The system of claim 3, wherein said sub-function compares one or more respective XML elements, their text contents and any relevant attributes of said one or more from nodes and said one or more to nodes.

5. The system of claim 1, wherein a level of said one or more from nodes and a level of said one or more to nodes is first established for comparison according to said domain of said from document and said to document.

6. The system of claim 1, wherein a human curator who is an expert in said domain establishes said matching-threshold.

7. The system of claim 6, wherein said match is a "significant enough" match.

8. The system of claim 7, when said pair determined to be said match and said pair having said from node and said to node at a same position in said from XML representation and said to XML representation respectively, indicates an identical match.

9. The system of claim 7, wherein a from node amongst said one or more from nodes having no match to any to node amongst said one or more to nodes indicates a deletion of said from node from said from document to said to document.

10. The system of claim 7, wherein a to node amongst said one or more to nodes having no match to any from node amongst said one or more from nodes indicates an insertion of said to node in said to document.

11. The system of claim 1, wherein said comparison report indicates matched nodes, moved nodes, deleted node and inserted nodes from said from document to said to document.

12. The system of claim 1, wherein one or more users provide one or more overriding-inputs to indicate if said one or more from nodes and said one or more to nodes are a match or not.

13. The system of claim 12, wherein said one or more overriding-inputs are included in initial training data provided to a supervised machine learning algorithm that based on said one or more overriding-inputs automatically determines said match-score in the future.

14. The system of claim 13, wherein said supervised machine learning algorithm executes on a server that accepts said one or more overriding-inputs from said one or more users operating at one or more clients.

15. A computer-implemented method executing computer-readable instructions by at least one microprocessor, said instructions stored in a non-transitory storage medium coupled to said at least one microprocessor, and said method comprising the steps of:
(a) establishing a from XML representation of a from document and a to XML representation of a to document, said from XML representation and said to XML representation having a predetermined schema;
(b) selecting using a structured XML query expression one or more from nodes in said from XML representation and one or more to nodes in said to XML representation;
(c) computing a match-score as a function of one or more scores each of which is computed by a sub-function comparing at least one of said one or more from nodes to at least one of said one or more to nodes, said sub-function chosen according to a domain of said from document and said to document, wherein said domain is a legislative domain;
(d) assigning said match-score to one or more pairs, each of said pairs consisting of one of said one or more from nodes and one of said one or more to nodes;
(e) determining corresponding said pair to be a match when said match-score is equal to or above a matching-threshold;
(f) producing a comparison report based on said match-score showing said one or more from nodes and said one or more to nodes;
(g) configuring said sub-function to perform [one or more of] at least:
(h) matching text contents of said at least one or more of said from nodes and of said at least one or more of said to nodes without matching corresponding numbers of said at least one or more of said from nodes and of said at least one or more of said to nodes;
(i) matching text contents of said at least one or more of said from nodes and of said at least one or more of said to nodes without matching corresponding numbers and without matching corresponding headings of said at least one or more of said from nodes and of said at least one or more of said to nodes;
(j) matching headings and identifiers of said at least one or more of said from nodes and of said at least one or more of said to nodes; and
(k) matching sorted 30-grams of said at least one or more of said from nodes and of said at least one or more of said to nodes.

16. The method of claim 15 where said one or more scores are weighted based on corresponding said sub-function computing said score and said match-score is computed as a weighted-average.

17. The method of claim 16 employing a human curator for establishing a level of said one or more from nodes and a level of said one or more to nodes for comparing, according to said domain of said from document and said to document.

18. The method of claim 17 with said human curator establishing said matching-threshold and further providing one or more overriding-inputs to indicate if said one or more from nodes and said one or more to nodes are a match or not.

19. The method of claim 18 with said human curator inputting one or more annotations in said comparison report for explaining said one or more overriding-inputs.

20. The method of claim 18 further providing said one or more overriding-inputs as initial training data to one or more supervised machine learning algorithms that based on said one or more overriding-inputs automatically adjust said match-score in the future.

21. The method of claim 20 executing said one or more supervised machine learning algorithms on a server, said server accepting said one or more overriding-inputs from said human curator operating at a client.

22. The method of claim 15 where said sub-function is one of a sine function and a step function, computing a value between 0 and 1 of its score.

23. A system comprising computer-readable instructions stored in a non-transitory storage medium and at least one microprocessor coupled to said storage medium for executing said computer-readable instructions, said at least one microprocessor configured to:
(a) establish a plurality of from XML representations of a corresponding plurality of from documents and a to XML representation of a to document, each of said from XML representations and said to XML representation having a predetermined schema;
(b) select using a structured XML query expression one or more from nodes in said plurality of from XML representations and one or more to nodes in said to XML representation;
(c) compute a match-score as a function of one or more scores each of which is computed by a sub-function comparing at least one of said one or more from nodes to at least one of said one or more to nodes, said sub-function chosen according to a domain of said plurality of from documents and said to document, wherein said domain is a legislative domain;
(d) assign said match-score to one or more pairs, each of said pairs consisting of one of said one or more from nodes and one of said one or more to nodes;
(e) determine corresponding said pair to be a match when said match-score is equal to or above a matching-threshold;
(f) produce a comparison report based on said match-score showing said one or more from nodes and said one or more to nodes;
(g) said sub-function configured to perform [one or more of] at least:
(h) match text contents of said at least one or more of said from nodes and of said at least one or more of said to nodes without matching corresponding numbers of said at least one or more of said from nodes and of said at least one or more of said to nodes;
(i) match text contents of said at least one or more of said from nodes and of said at least one or more of said to nodes without matching corresponding numbers and without matching corresponding headings of said at least one or more of said from nodes and of said at least one or more of said to nodes;
(j) match headings and identifiers of said at least one or more of said from nodes and of said at least one or more of said to nodes; and
(k) match sorted 30-grams of said at least one or more of said from nodes and of said at least one or more of said to nodes.

\* \* \* \* \*